US011020675B2

United States Patent
Suzuki et al.

(10) Patent No.: US 11,020,675 B2
(45) Date of Patent: Jun. 1, 2021

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Toshiaki Suzuki, Kyoto (JP); Miyuki Hirose, Kyoto (JP); Misaki Hiraga, Kyoto (JP); Yoshiaki Onishi, Kyoto (JP); Shuichiro Nishiya, Tokyo (JP); Yuya Kumagai, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/424,733

(22) Filed: May 29, 2019

(65) Prior Publication Data

US 2019/0366221 A1  Dec. 5, 2019

(30) Foreign Application Priority Data

Jun. 5, 2018  (JP) .............................. JP2018-107865

(51) Int. Cl.
*A63F 13/847* (2014.01)
*A63F 13/533* (2014.01)
(Continued)

(52) U.S. Cl.
CPC ............ *A63F 13/847* (2014.09); *A63F 13/48* (2014.09); *A63F 13/533* (2014.09); *A63F 13/56* (2014.09);
(Continued)

(58) Field of Classification Search
CPC ...... A63F 13/211; A63F 13/847; A63F 13/48; A63F 13/533; A63F 13/56; A63F 13/843;
(Continued)

(56) References Cited

U.S. PATENT DOCUMENTS 5,269,687 A * 12/1993 Mott ....................... A63F 13/10
434/69
10,576,370 B1 * 3/2020 Adamitskiy .......... A63F 13/358
(Continued)

FOREIGN PATENT DOCUMENTS

JP      2016-000170 A    1/2016

OTHER PUBLICATIONS

"Power Up" posted Feb. 16, 2016 at https://web.archive.org/web/20160206213729/https://www.giantbomb.com/power-up/3015-700/ (Year : 2016).*

(Continued)

*Primary Examiner* — Omkar A Deodhar
*Assistant Examiner* — Ross A Williams
(74) *Attorney, Agent, or Firm* — Nixon & Vanderhye PC

(57) ABSTRACT

A first game played by at least one user belonging to a team is executed, and a second game influenced by a result of the first game is executed. Then, at least before the first game is started, when the first game is suspended, or after the first game is ended, a first notification and a second notification for urging the user of the team to perform an operation of moving an entirety of a controller are given, and when the operation of moving the entirety of the controller is performed using the at least one controller operated by the users belonging to the team, and a success condition is satisfied, a game parameter used in the second game is increased or decreased so as to obtain an advantageous effect for the team or the user belonging to the team.

14 Claims, 19 Drawing Sheets

(51) Int. Cl.
  *A63F 13/48* (2014.01)
  *A63F 13/56* (2014.01)
  *A63F 13/88* (2014.01)
  *A63F 13/843* (2014.01)
  *A63F 13/428* (2014.01)
  *A63F 13/235* (2014.01)
  *A63F 13/285* (2014.01)
  *A63F 13/211* (2014.01)

(52) U.S. Cl.
  CPC ............ *A63F 13/843* (2014.09); *A63F 13/88* (2014.09); *A63F 13/211* (2014.09); *A63F 13/235* (2014.09); *A63F 13/285* (2014.09); *A63F 13/428* (2014.09)

(58) Field of Classification Search
  CPC ...... A63F 13/88; A63F 13/235; A63F 13/285; A63F 13/428
  See application file for complete search history.

(56) References Cited

U.S. PATENT DOCUMENTS

| | | | | |
|---|---|---|---|---|
| 10,576,379 | B1* | 3/2020 | Wakeford | A63F 13/73 |
| 2008/0032759 | A1* | 2/2008 | Takahashi | A63F 13/795 |
| | | | | 463/1 |
| 2009/0048009 | A1* | 2/2009 | Brekelmans | A63F 13/573 |
| | | | | 463/4 |
| 2010/0151948 | A1* | 6/2010 | Vance | A63F 13/10 |
| | | | | 463/43 |
| 2011/0223994 | A1* | 9/2011 | Yerli | A63F 13/847 |
| | | | | 463/31 |
| 2012/0081531 | A1* | 4/2012 | DeAngelis | G09B 19/0038 |
| | | | | 348/77 |
| 2012/0142429 | A1* | 6/2012 | Muller | A63F 13/35 |
| | | | | 463/42 |
| 2012/0142436 | A1* | 6/2012 | Sato | A63F 13/44 |
| | | | | 463/43 |
| 2012/0225717 | A1* | 9/2012 | Kuroda | A63F 13/358 |
| | | | | 463/31 |
| 2014/0015650 | A1* | 1/2014 | Ur | A63F 13/10 |
| | | | | 340/407.1 |
| 2014/0274359 | A1* | 9/2014 | Helava | A63F 13/69 |
| | | | | 463/29 |
| 2014/0274371 | A1* | 9/2014 | Helava | A63F 13/12 |
| | | | | 463/31 |
| 2015/0074698 | A1* | 3/2015 | Pinto | H04N 21/6582 |
| | | | | 725/14 |
| 2015/0286275 | A1* | 10/2015 | Huang | A63F 13/213 |
| | | | | 345/156 |
| 2020/0276504 | A1* | 9/2020 | Liu | A63F 13/847 |

OTHER PUBLICATIONS

Japanese-language Office Action issued in Japanese Application No. 2018-107865 dated Mar. 25, 2021 with English machine translation (7 pages).
In "samba DE amigo" formal HP, lecture on operation method, my navigation news, Dec. 11, 2008, https://news.mynavi.jp/article/20081211-a015/ (2 pages).

* cited by examiner

FIG. 10
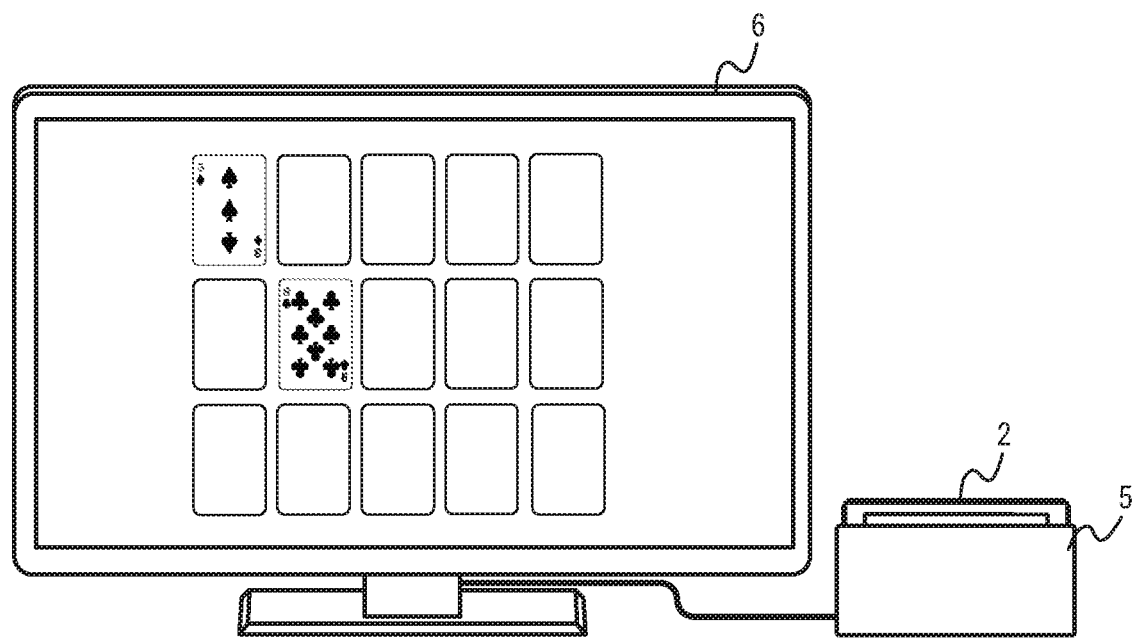
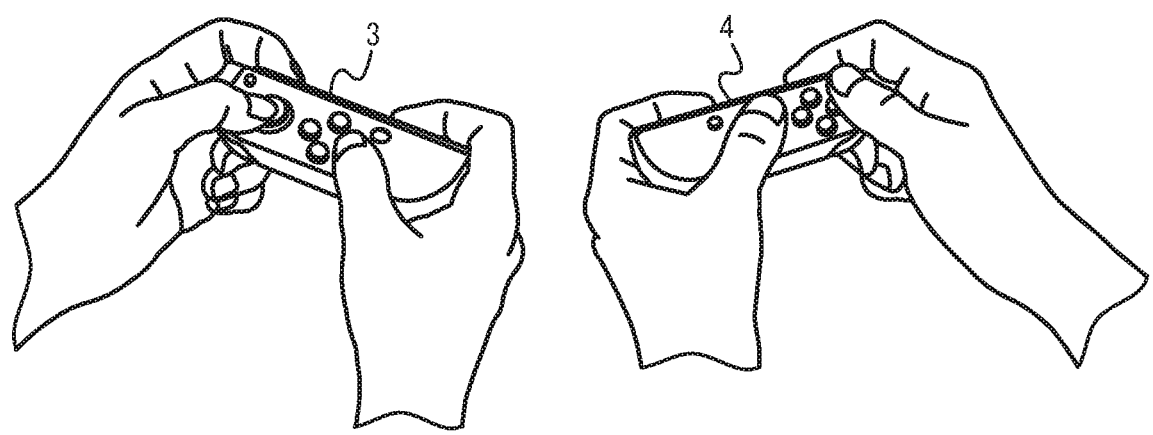

FIG. 11
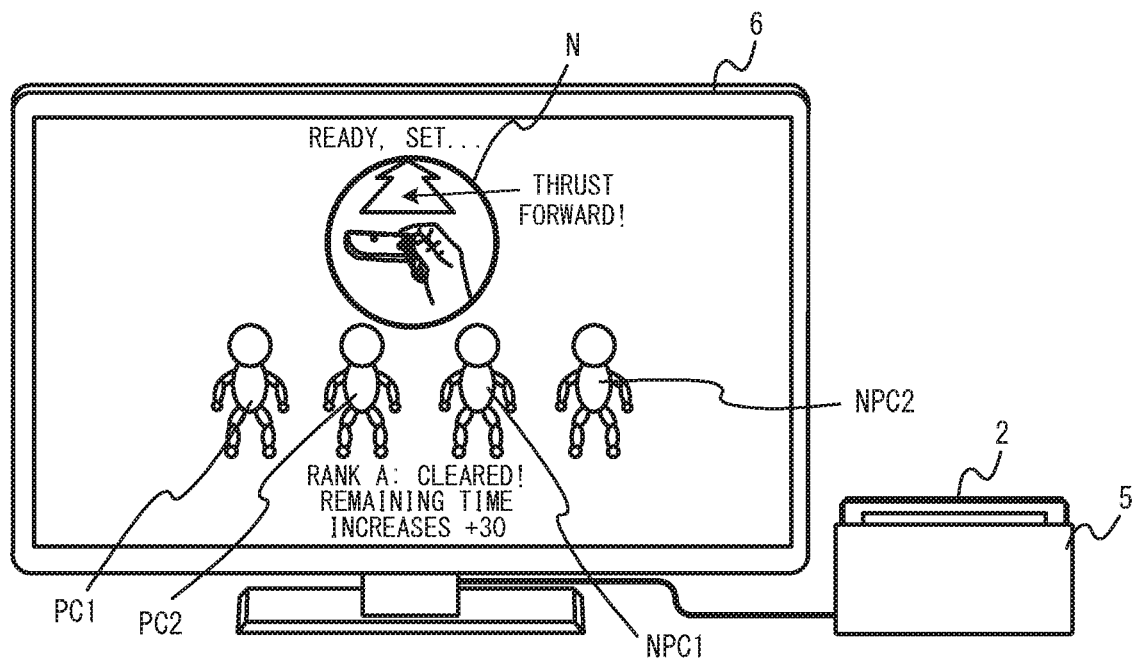
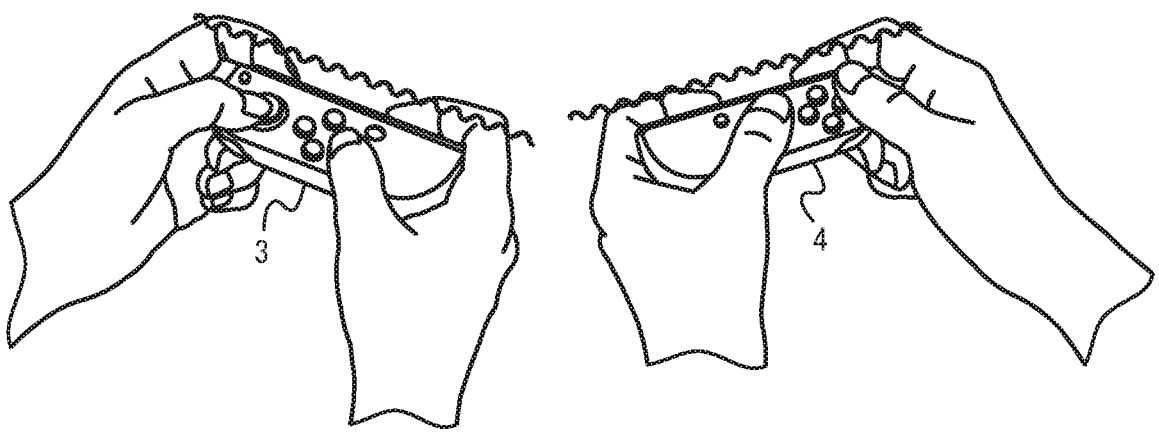

FIG. 12
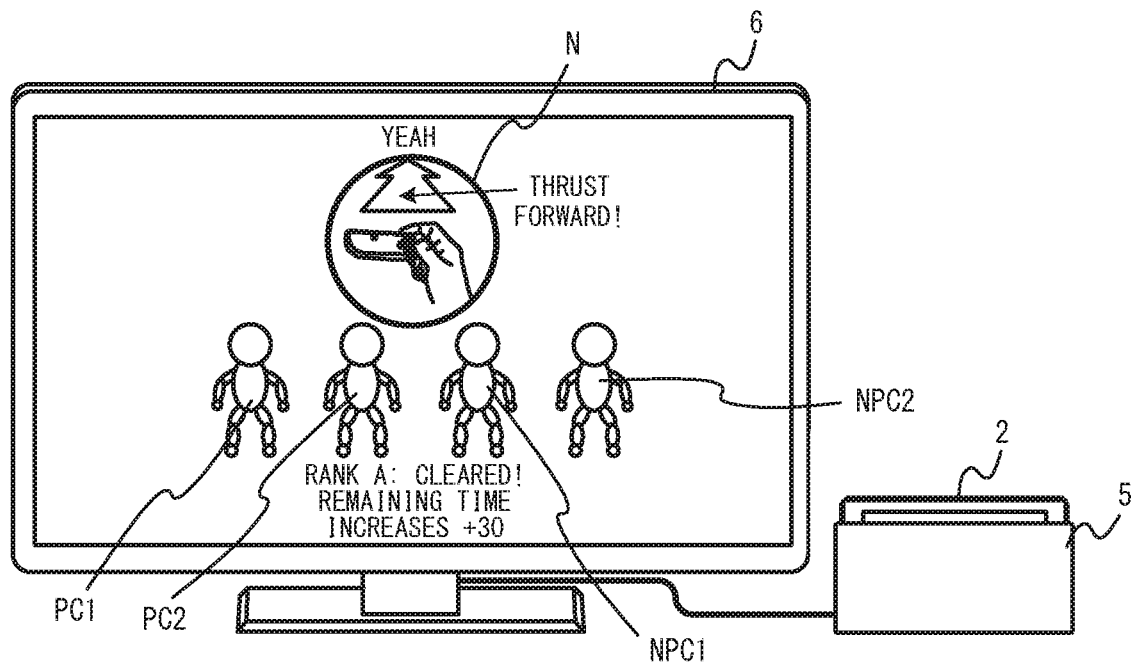
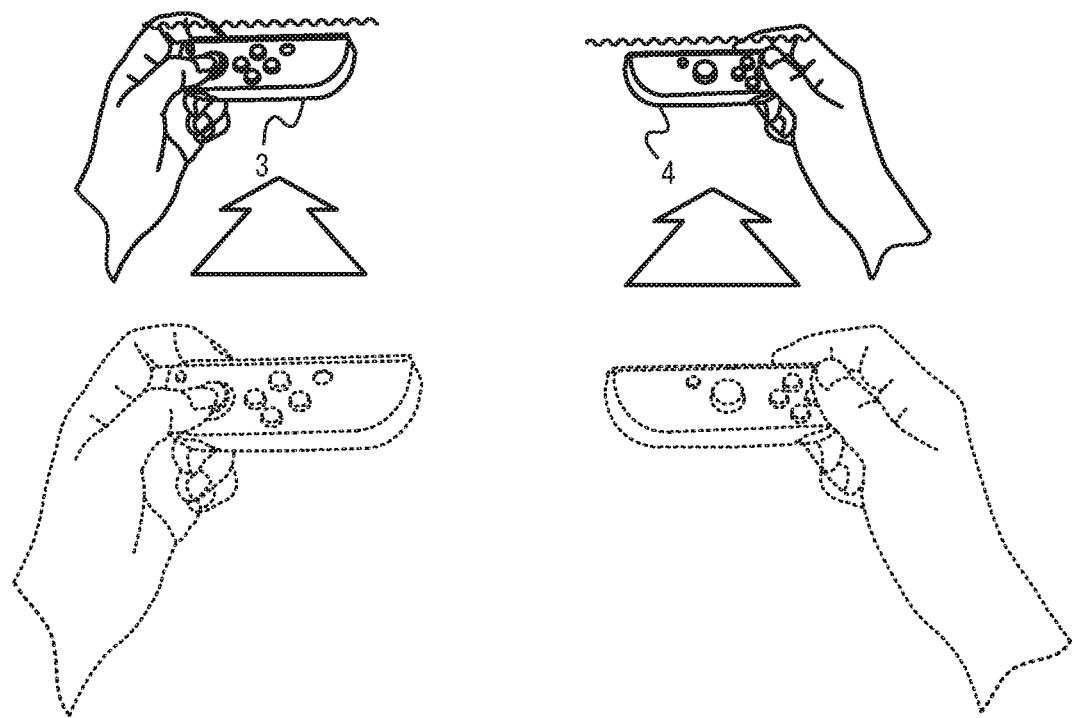

FIG. 13
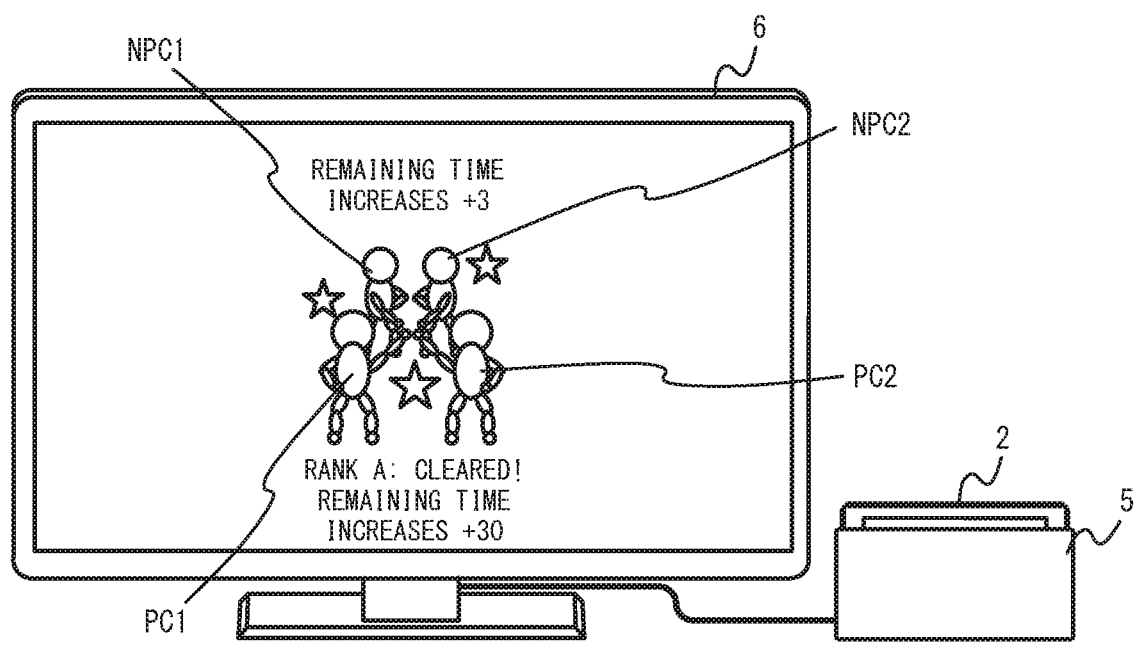

F I G. 1 5
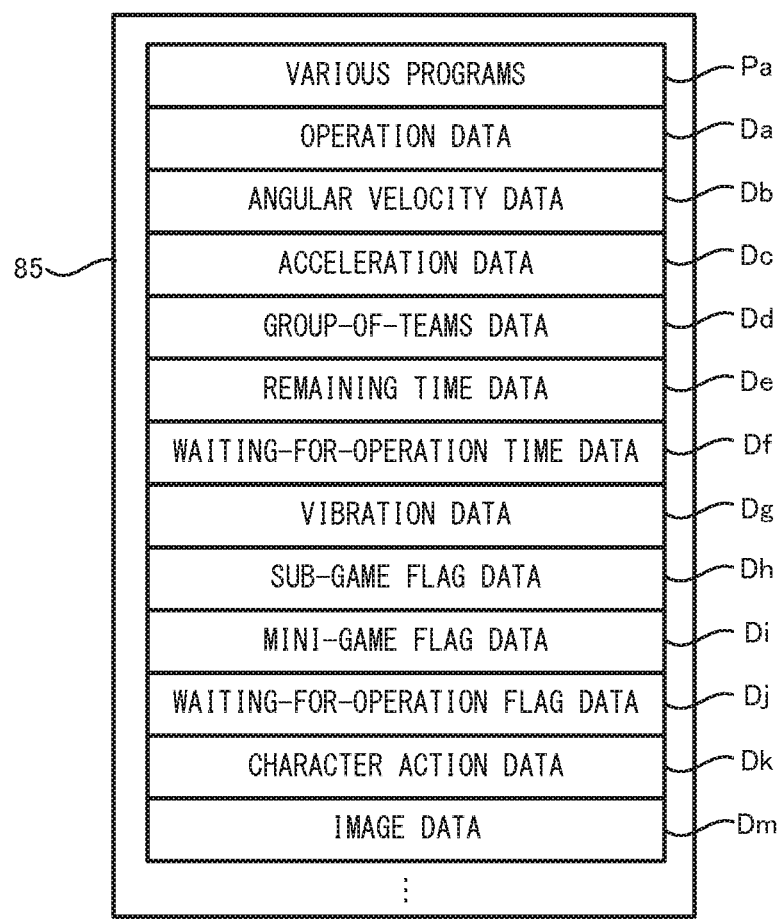

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2018-107865, filed on Jun. 5, 2018, is incorporated herein by reference.

FIELD

The technology shown here relates to a storage medium having stored therein an information processing program, an information processing apparatus, an information processing system, and an information processing method for performing a process corresponding to an operation using a controller.

BACKGROUND AND SUMMARY

Conventionally, there is a game system for performing a game where teams compete with each other by a plurality of users operating controllers.

In the game system, however, there is room for further improvement in enhancing the interest of a user in a game where a group of teams is set.

Therefore, it is an object of an exemplary embodiment to provide a storage medium having stored therein an information processing program, an information processing apparatus, an information processing system, and an information processing method that are capable of enhancing the interest of a user in a game where a group of teams is set.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein an information processing program according to the exemplary embodiment, a non-transitory computer-readable storage medium having stored therein an information processing program is executed by a computer included in an information processing apparatus for performing a process using a controller including an inertial sensor. The information processing program causes the computer to execute: setting a group of teams including at least one team composed of a plurality of users, and executing a first game played by at least one user belonging to the team; at least before the first game is started, when the first game is suspended, or after the first game is ended, outputting a signal for giving a first notification for, by at least one of an image and a sound, urging the user of the team to perform an operation of moving an entirety of the controller; outputting a signal for giving, together with the first notification, a second notification for vibrating the controller operated by the user belonging to the team to the controller; determining whether or not the operation of moving the entirety of the controller is performed using the at least one controller operated by the users belonging to the team; based on the determination, determining whether or not a success condition is satisfied; and when it is determined that the success condition is satisfied, a predetermined game presentation is performed.

Based on the above, a user belonging to a team composed of a plurality of users performs an operation, whereby a predetermined game representation is performed. Thus, it is possible to enhance the interest of a user in a game where a group of teams is set. Further, the operation is urged not only by at least one of an image and a sound, but also by a stimulus from a controller. Thus, the user can certainly recognize that the user performs the operation.

Further, in the executing of the first game, the first game may be executed in the middle of the second game.

Based on the above, a first game is performed in the middle of a second game, and a notification for urging an operation is given or a game representation corresponding to the operation is performed when, after, or before the first game is suspended. Thus, it is possible to enjoy the progress of a game rich in variations.

Further, a second game influenced by a result of the first game may be executed.

Based on the above, a second game influenced by a result of a first game is performed, and a notification for urging an operation is given or a game representation corresponding to the operation is performed when, before, or after the first game is suspended. Thus, it is possible to enjoy the progress of a game rich in variations.

When it is determined that the success condition is satisfied after the first game is ended, an advantageous effect in the second game may be given to the team or the user belonging to the team.

Based on the above, when a success condition for an operation is satisfied, a team having performed the operation can advance the second game advantageously. Thus, it is possible to enhance a sense of purpose for performing an operation.

Further, as the advantageous effect, a game parameter used in the second game may be increased or decreased.

Based on the above, when a success condition for an operation is satisfied, a game parameter used in the second game is increased or decreased, whereby it is possible to advance the second game advantageously. Thus, it is possible to enhance a sense of purpose for performing an operation.

Further, in the increasing or decreasing of the game parameter, a remaining time until the second game ends may be increased as the advantageous effect.

Based on the above, in a second game having a time restriction, the time restriction is eased. Thus, it is possible to realize an advantageous effect obtained by performing an operation.

Further, in the increasing or decreasing of the game parameter, when it is determined that the success condition is satisfied before the first game is started, an advantageous effect in the first game may be given to the team or the user belonging to the team.

Based on the above, when a success condition for an operation is satisfied, a team having performed the operation can advance a first game advantageously. Thus, it is possible to enhance a sense of purpose for performing an operation.

Further, in the increasing or decreasing of the game parameter, when it is determined that the success condition is satisfied when the first game is suspended, an advantageous effect in the first game may be given to the team or the user belonging to the team.

Based on the above, when a success condition for an operation is satisfied, a team having performed the operation can advance a first game advantageously. Thus, it is possible to enhance a sense of purpose for performing an operation.

Further, in the executing of the first game, a game where a plurality of teams compete against each other may be executed as the first game. In the giving of the second notification, the second notification may be given to a team having won the first game or obtained a predetermined accomplishment in the first game.

Based on the above, when the result of a first game is an excellent result, the right to perform an operation is obtained. Thus, it is possible to enhance a sense of purpose for performing the first game.

Further, in the determining of whether or not the success condition is satisfied, when it is determined that the operation of moving the entirety of the controller is performed using all the controllers operated by all the users belonging to the team, it may be determined that the success condition is satisfied.

Further, in the determining of whether or not the success condition is satisfied, when the operation of moving the entirety of the controller is performed at the same timing using the controllers operated by a plurality of users belonging to the team, it may be determined that the success condition is satisfied.

Based on the above, all a plurality of users belonging to a team are required to perform operations at the same timing. Thus, it is possible to enhance a sense of togetherness between the plurality of users.

Further, in the determining of whether or not the operation of moving the entirety of the controller is performed, when it is not determined that the success condition is satisfied within a threshold time since the first notification is given, a process of determining whether or not the operation of moving the entirety of the controller is performed may be ended.

Based on the above, to make an operation successful, it is necessary to perform the operation within a threshold time since a first notification is given. Thus, it is possible to shift to another process after the threshold time ends. Thus, it is possible to prevent the situation where a process does not proceed without an operation being performed.

Further, in the giving of the first notification, the first notification may be given multiple times. In the giving of the second notification, the second notification is given in accordance with a timing when the first notification may be given.

Based on the above, it is possible to cause the user to notice that an operation is urged.

Further, in the increasing or decreasing of the game parameter, as the predetermined game representation, a representation may be performed in which a character that is operated by the user and appears in the first game performs a motion corresponding to the operation of moving the entirety of the controller.

Based on the above, it is possible to enhance the sense of exaltation of a user due to the success of an operation.

Further, the exemplary embodiment can be carried out in the forms of an information processing apparatus, an information processing system, and an information processing method.

According to the exemplary embodiment, a user belonging to a team composed of a plurality of users performs an operation, whereby a predetermined game representation is performed. Thus, it is possible to enhance the interest of a user in a game where a group of teams is set.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 is a non-limiting example of a game image displayed in the game played by operating the left controller 3 or the right controller 4;

FIG. 11 is a non-limiting example of a game image displayed in the game played by operating the left controller 3 or the right controller 4;

FIG. 12 is a non-limiting example of a game image displayed in the game played by operating the left controller 3 or the right controller 4;

FIG. 13 is a non-limiting example of a game image displayed in the game played by operating the left controller 3 or the right controller 4;

FIG. 15 is a diagram showing a non-limiting example of a data area set in a DRAM 85 of the main body apparatus 2 in the exemplary embodiment;

DETAILED DESCRIPTION OF NON-LIMITING EXAMPLE EMBODIMENTS

A description is given of a game system according to an exemplary embodiment. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
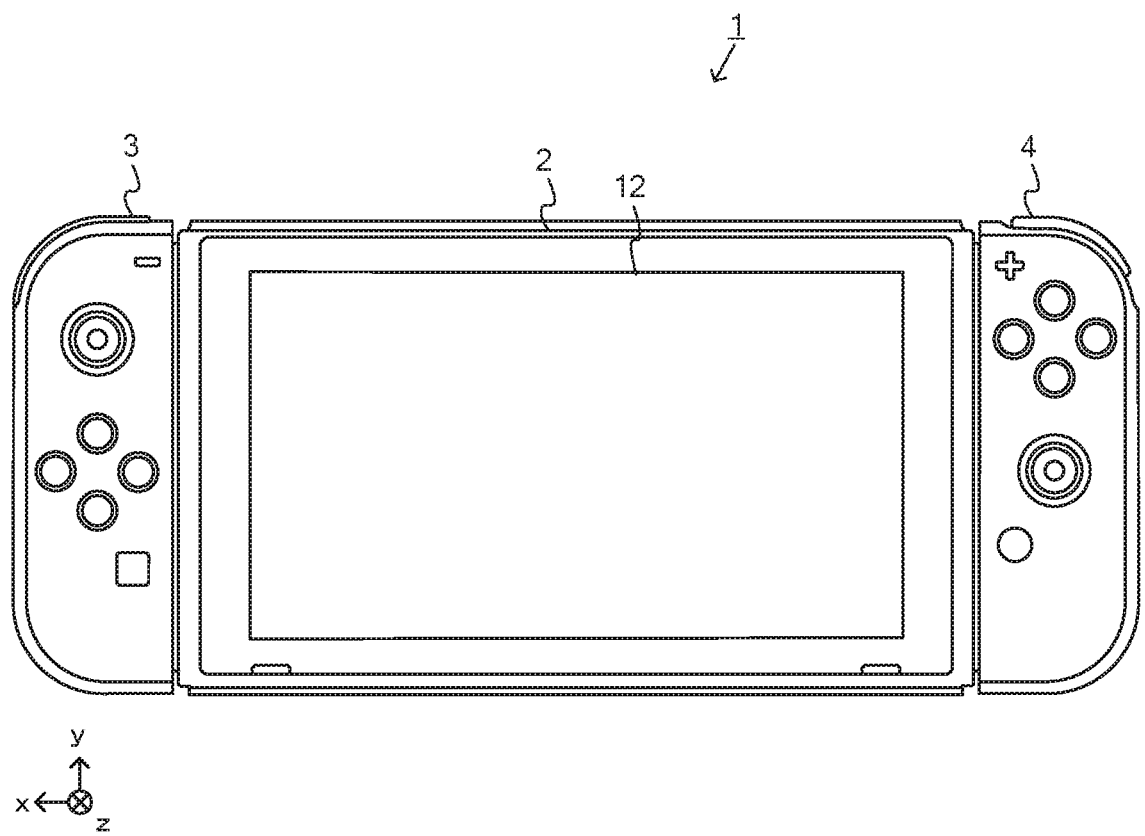
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
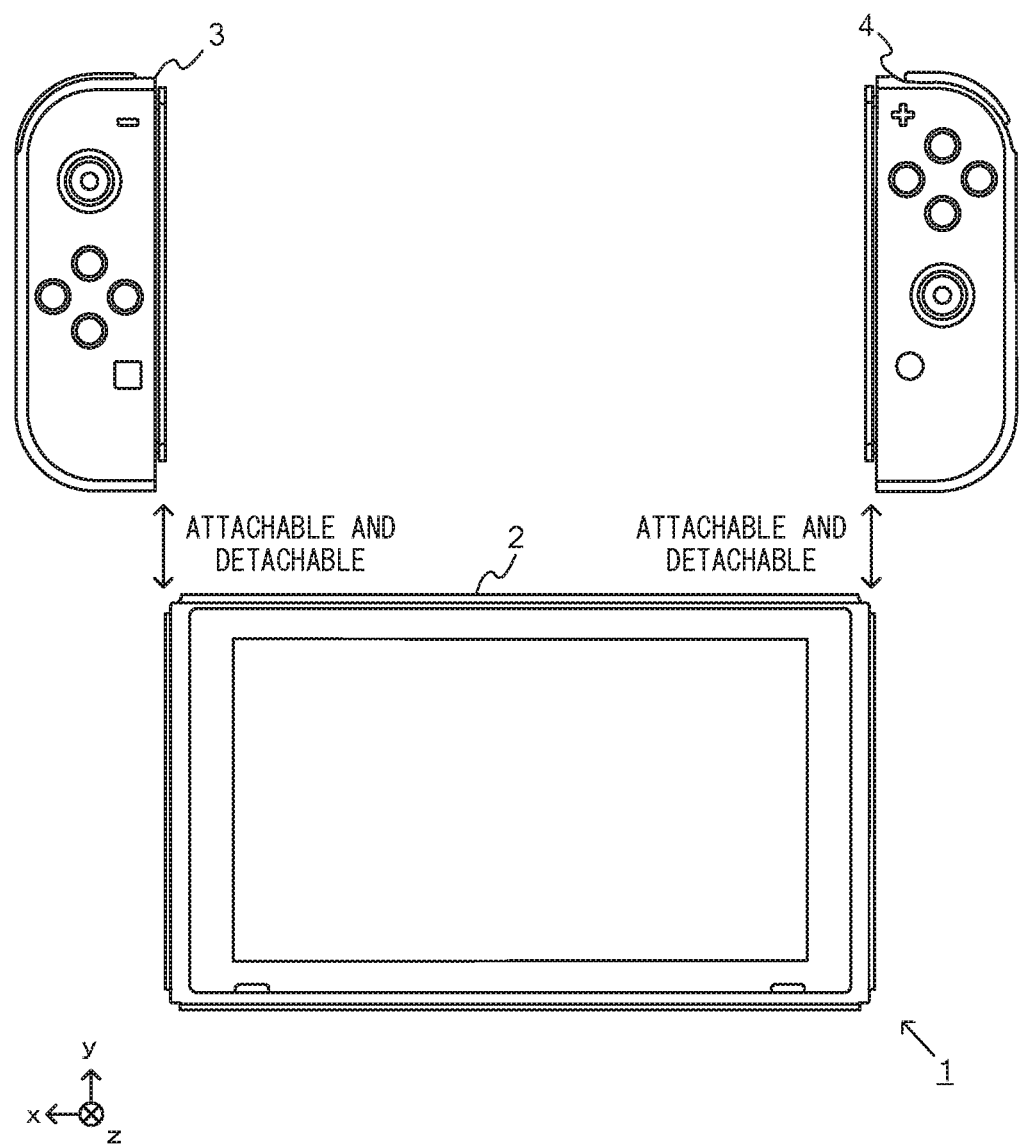
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
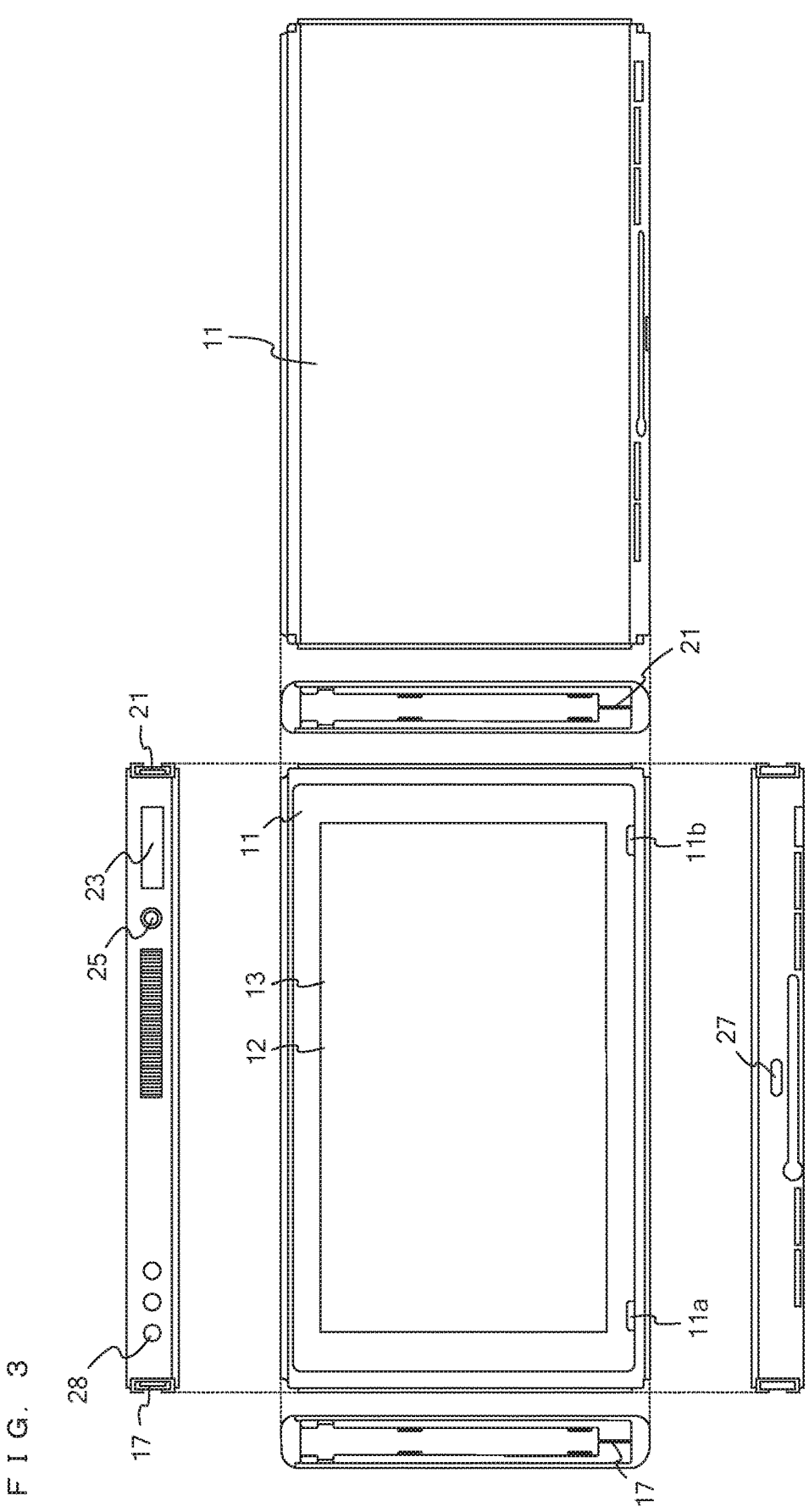
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
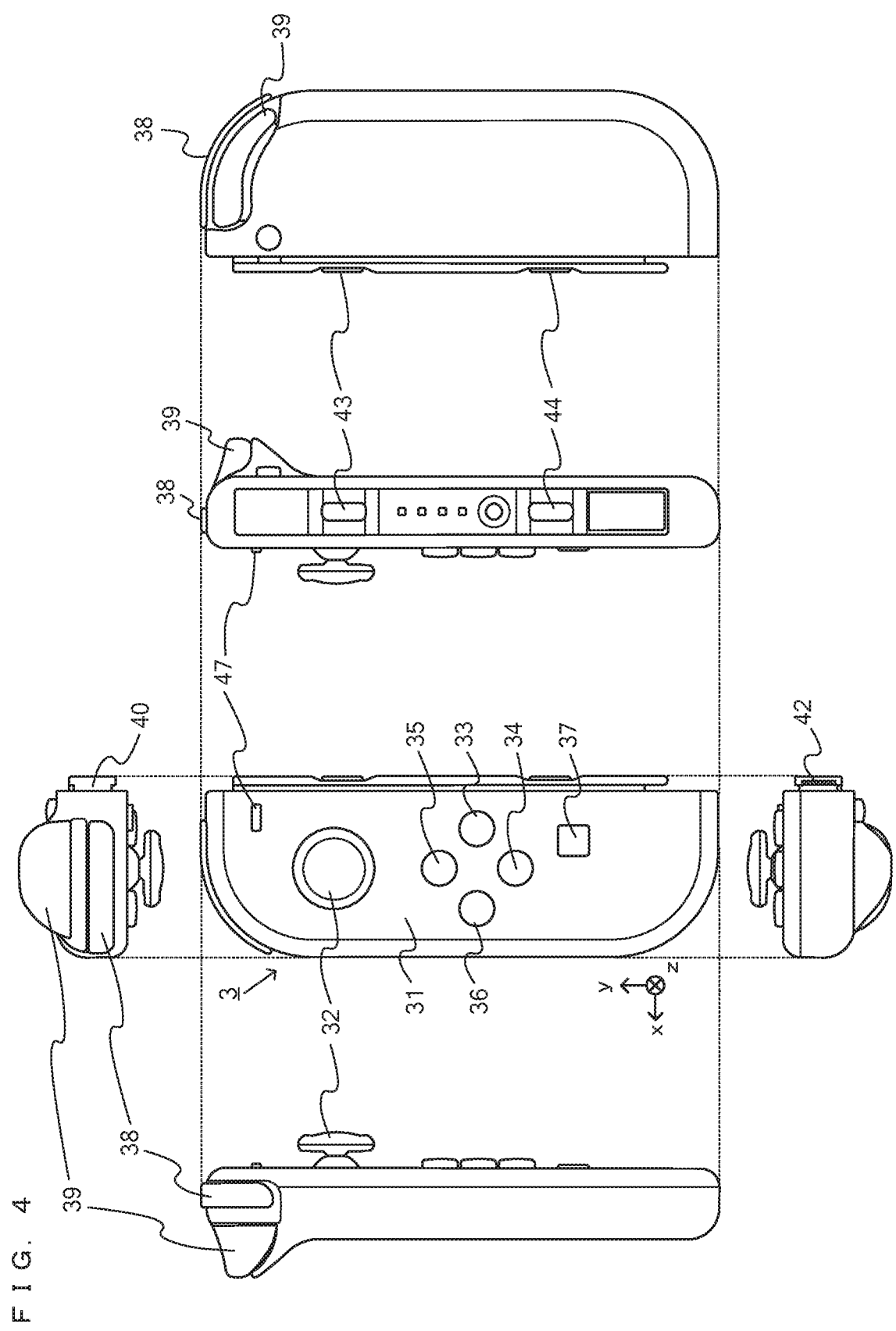
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
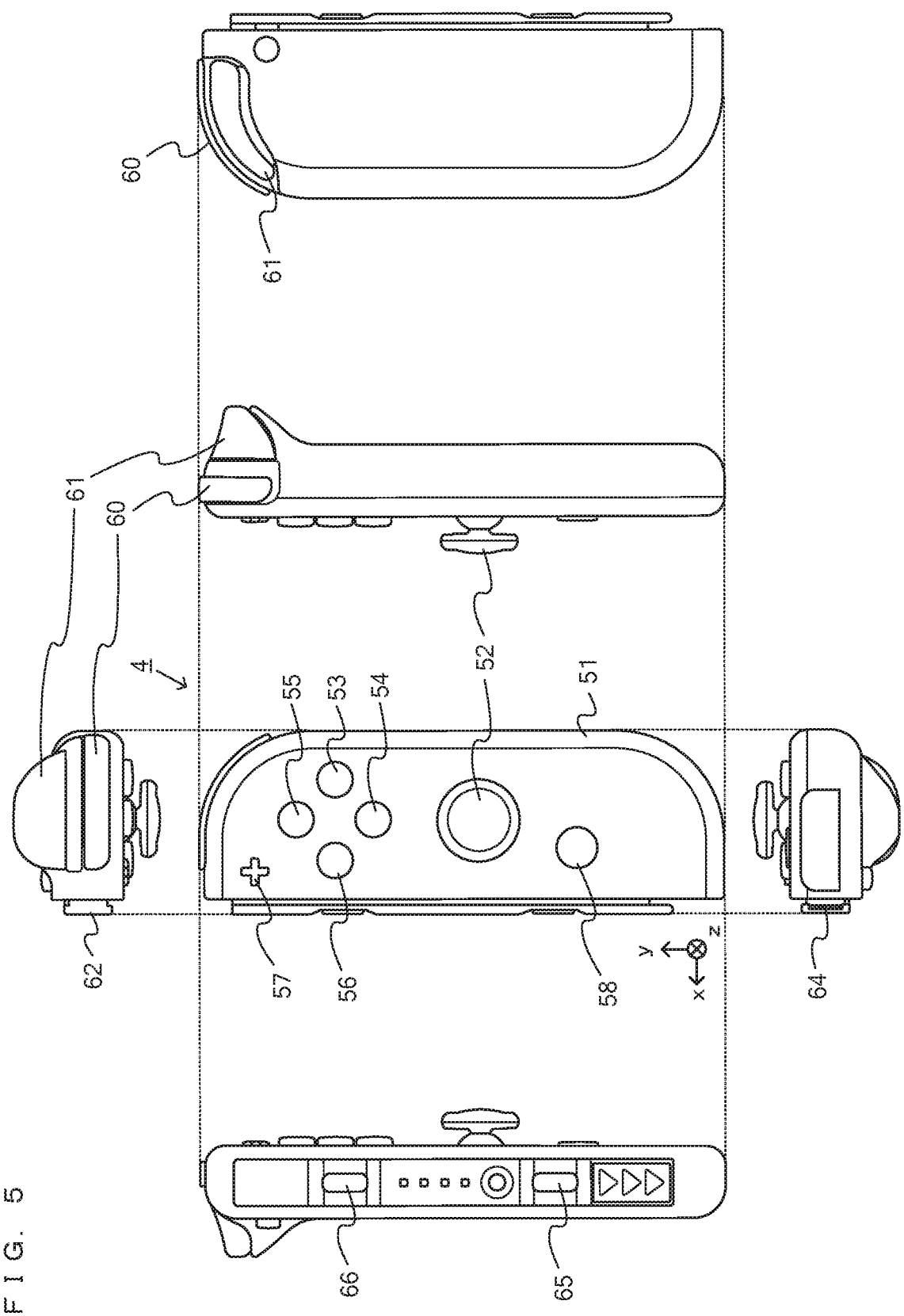
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
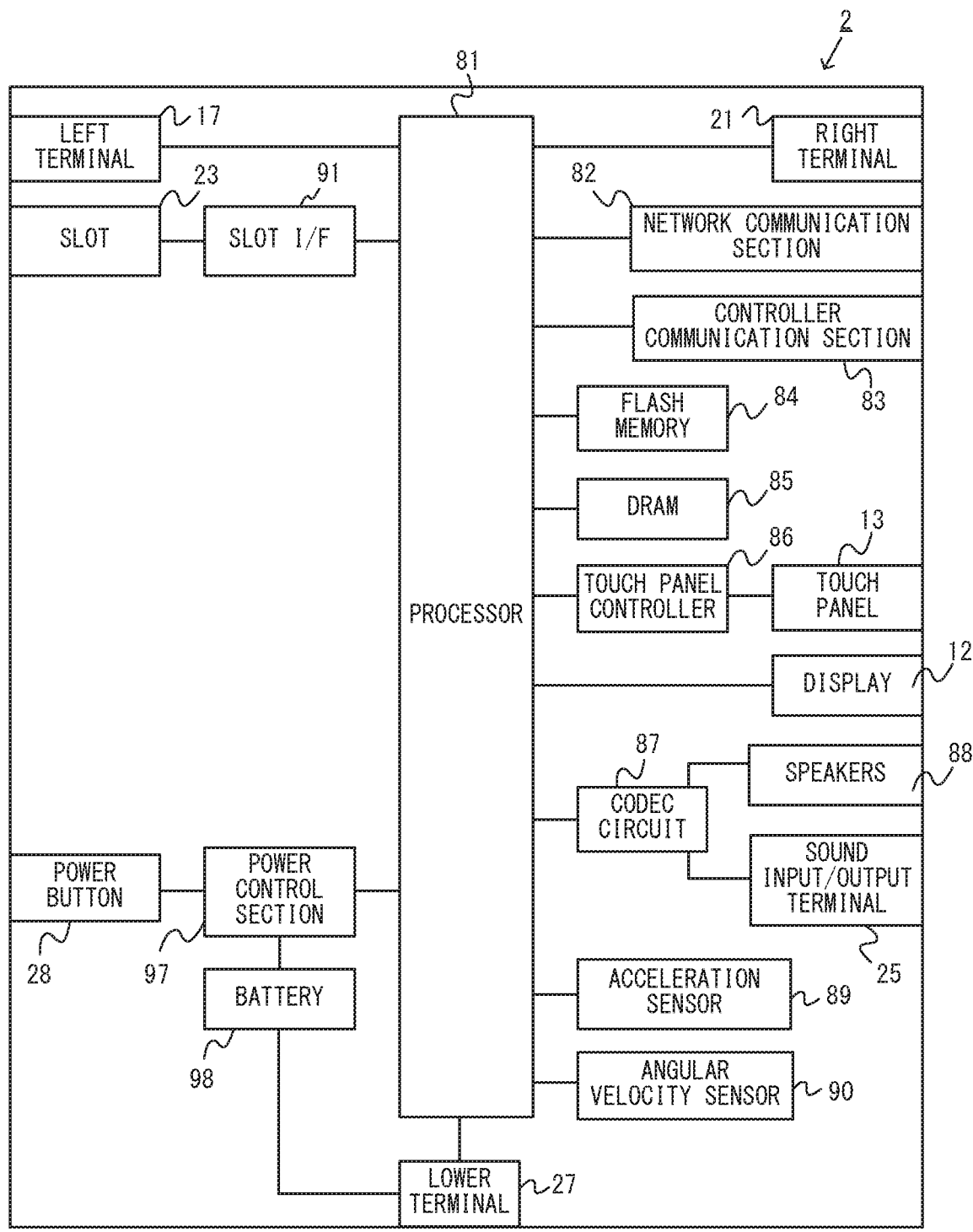
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
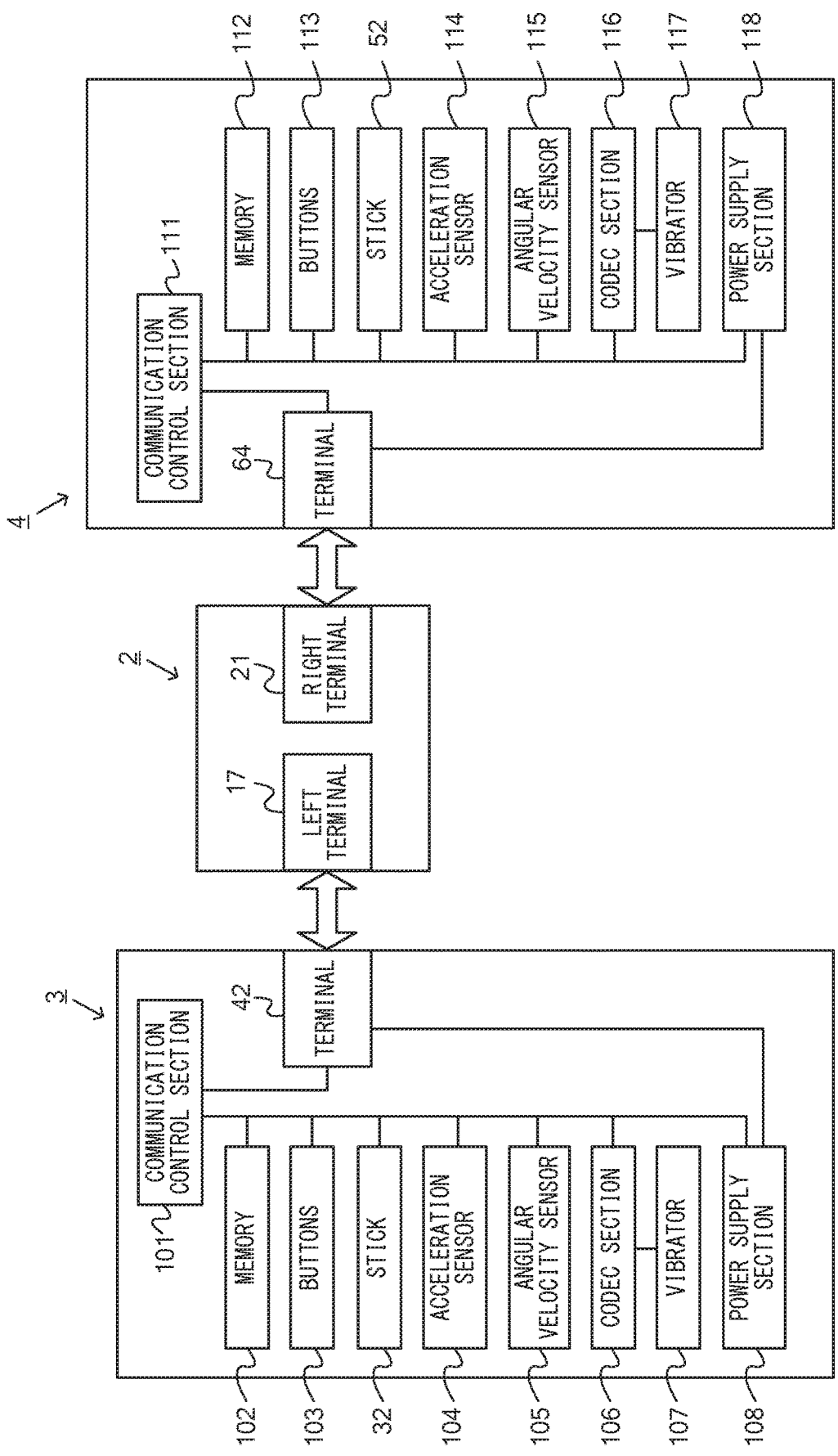
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing. It should be noted that the acceleration sensor 104 and the angular velocity sensor 105 correspond to an example of an inertial sensor provided in a controller.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3. It should be noted that the acceleration sensor 114 and the angular velocity sensor 115 correspond to another example of the inertial sensor included in the controller.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor 6. A description is given below using a game system in a use form in which an image (and a sound) is output to the stationary monitor 6 by attaching the main body apparatus 2 alone to the cradle in the state where the left controller 3 and the right controller 4 are detached from the main body apparatus 2.

As described above, in the exemplary embodiment, the game system 1 can also be used in the state where the left controller 3 and the right controller 4 are detached from the main body apparatus 2 (referred to as a "separate state"). As a form in a case where an operation is performed on an application (e.g., a game application) using the game system 1 in the separate state, a form is possible in which two users each use the left controller 3 and the right controller 4. Further, when three or more users perform operations using the same application, a form is possible in which a plurality of sets of the left controller 3 and the right controller 4 are prepared, and each user uses either one of the left controller 3 and the right controller 4. Further, as another form in which a plurality of users perform operations, a form is possible in which each user uses both the left controller 3 and the right controller 4. In this case, for example, a form is possible in which a plurality of sets of the left controller 3 and the right controller 4 are prepared, and each user uses one of the plurality of sets.

FIGS. 8 to 14 are diagrams showing examples of the state where in the separate state, two users use the game system 1 by each user operating one of the left controller 3 and the right controller 4. As shown in FIGS. 8 to 14, in the separate state, a first user and a second user can view an image displayed on the stationary monitor 6 while performing operations by the first user holding the left controller 3 with their both hands, and the second user holding the right controller 4 with their both hands.

For example, in the exemplary embodiment, the first user holds the left controller 3 with their both hands such that the transverse direction of the longitudinal direction of the left controller 3 (a down direction shown in FIG. 1 (a negative y-axis direction)), which is vertically long and approximately plate-shaped, is the horizontal direction, and a side surface of the left controller 3 that is in contact with the main body apparatus 2 when the left controller 3 is attached to the main body apparatus 2 (a side surface on which a slider 40 is provided) is directed forward, and also the main surface of the left controller 3 (a surface on which the analog stick 32 and the like are provided) is directed upward. That is, the left controller 3 held with both hands of the first user is in the state where a negative x-axis direction is directed in the forward direction of the user, and a positive z-axis direction is directed upward. Further, the second user holds the right controller 4 with their both hands such that the transverse direction of the longitudinal direction of the right controller 4 (a down direction shown in FIG. 1 (a negative y-axis direction)), which is vertically long and approximately plate-shaped, is the horizontal direction, and a side surface of the right controller 4 that is in contact with the main body apparatus 2 when the right controller 4 is attached to the main body apparatus 2 (a side surface on which a slider 62 is provided) is directed forward, and also the main surface of the right controller 4 (a surface on which the analog stick 52 and the like are provided) is directed upward. That is, the right controller 4 held with both hands of the second user is in the state where a positive x-axis direction is directed in the forward direction of the user, and a positive z-axis direction is directed upward.

As described above, in accordance with the fact that the operation buttons or the stick of the left controller 3 or the right controller 4 held with both hands are operated, game play is performed. In the state where the left controller 3 or the right controller 4 is held with both hands (hereinafter, such an operation method will occasionally be referred to as a "horizontally-held operation method"), each controller is moved in up, down, left, right, front, and back directions, rotated, or swung, whereby game play is performed in accordance with the motion or the orientation of the controller. Then, in the above game play, the acceleration sensor 104 of the left controller 3 can detect accelerations in the xyz-axis directions as operation inputs, and the angular velocity sensor 105 can detect angular velocities about the xyz-axis directions as operation inputs. Further, the acceleration sensor 114 of the right controller 4 can detect accelerations in the xyz-axis directions as operation inputs, and the angular velocity sensor 115 can detect angular velocities about the xyz-axis directions as operation inputs.

Further, when game play is performed by the user holding the left controller 3 and/or the right controller 4, vibrations are imparted to the left controller 3 and/or the right controller 4 in accordance with the situation of the game. As described above, the left controller 3 includes the vibrator 107, and the right controller 4 includes the vibrator 117. The processor 81 of the main body apparatus 2 transmits vibration data to the left controller 3 and/or the right controller 4 in accordance with the situation of the game that is being executed by the processor 81, and thereby can vibrate the vibrator 107 and/or the vibrator 117 at an amplitude and a frequency corresponding to the vibration data.

Figure 8:
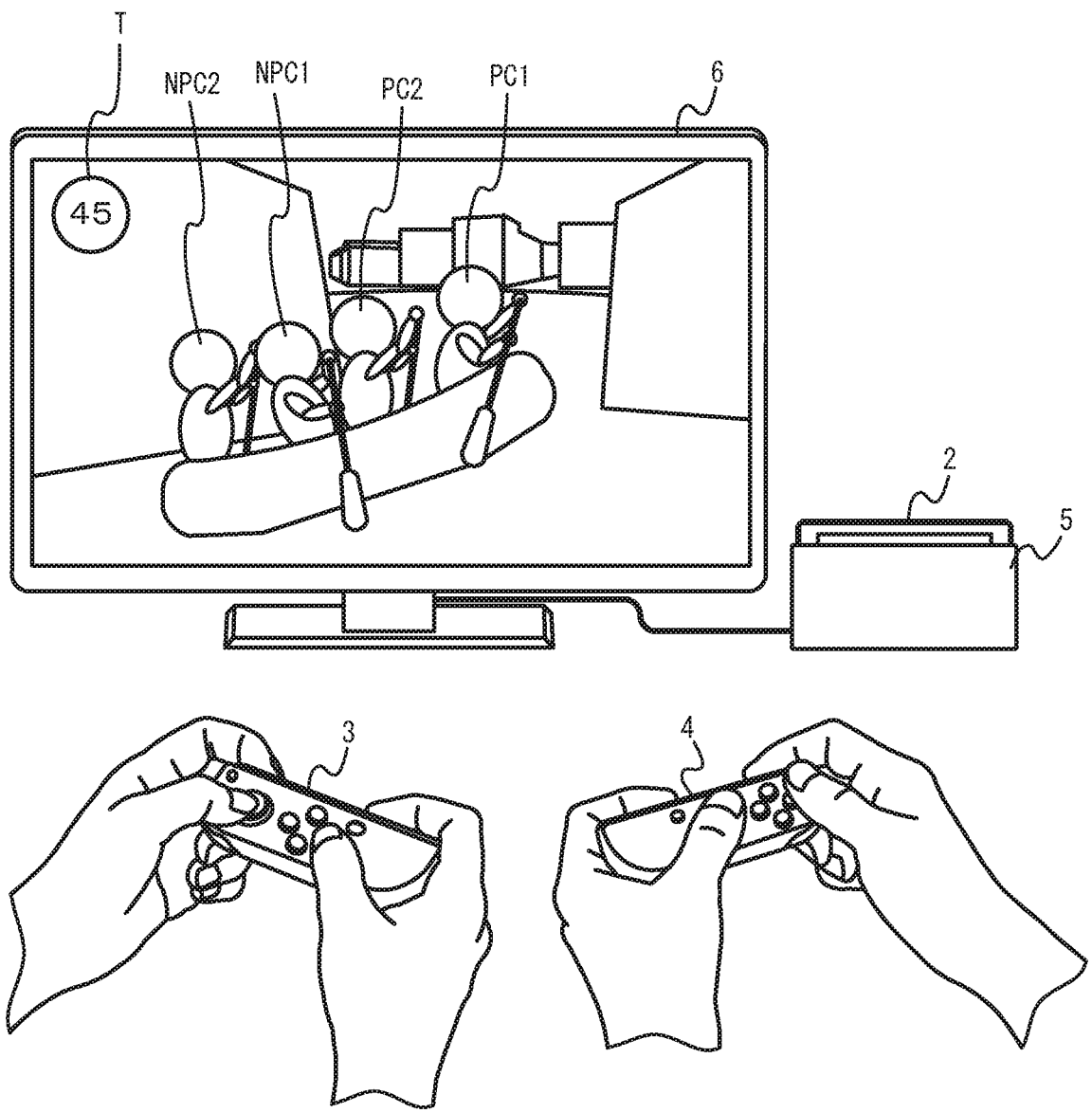
FIG. 8 is a non-limiting example of a game image displayed in a game played by operating the left controller 3 or the right controller 4.

FIGS. 8 to 14 show examples of game images displayed in a game played by operating the left controller 3 or the right controller 4. In this exemplary game, a group of teams including at least one team composed of a plurality of users is set, and the users belonging to the team cooperate to play a game. For example, as shown in FIG. 8, in this exemplary game, an image of a main game where a plurality of characters (two player characters PC1 and PC2 and two non-player characters NPC1 and NPC2 in the example of FIG. 8) cooperate to reach a goal within a time limit (e.g., a rafting game where a plurality of characters board a ship toward a goal) is displayed on the stationary monitor 6. Then, a first user operating the left controller 3 can operate the first player character PC1 by swinging the main body of the left controller 3, changing the orientation of the main body of the left controller 3, or operating the analog stick 32 or the operation buttons 33 to 36. Further, a second user belonging to the same team as the first user can operate the second player character PC2 by operating the right controller 4, swinging the main body of the right controller 4, changing the orientation of the main body of the right controller 4, or operating the analog stick 52 or the operation buttons 53 to 56. It should be noted that the first non-player character NPC1 and the second non-player character NPC2 belong to a character team operated by the team of the first user and the second user (i.e., a character team to which the player characters PC1 and PC2 belong), but the actions of the first non-player character NPC1 and the second non-player character NPC2 are automatically controlled by a computer (the processor 81 of the main body apparatus 2). It should be noted that a second game corresponds to, as an example, the main game. Further, a character that appears in a first game or the second game and is operated by a user corresponds to, as an example, the player characters PC1 and PC2.

Further, in the game image of the main game, a remaining time notification image T is displayed that indicates the time limit in the main game, i.e., the remaining time allowed until the plurality of characters reach the goal. The remaining time notification image T indicates a numerical value corresponding to the remaining time and gives a notification of the state where the remaining time is counted down. As an example, in the example of the main game image shown in FIG. 8, the remaining time notification image T is displayed that indicates that the remaining time is 45 seconds.

Figure 9:
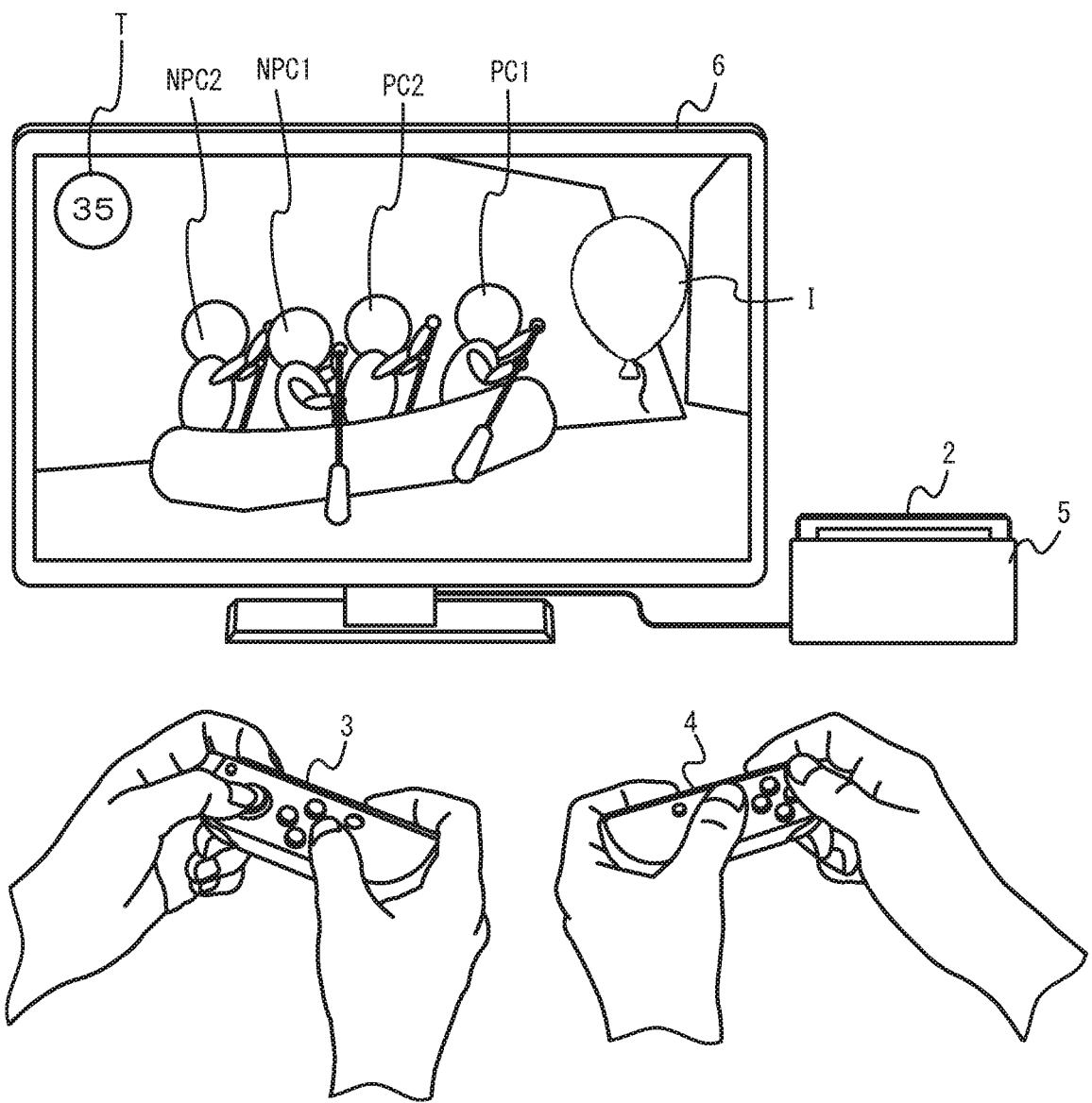
FIG. 9 is a non-limiting example of a game image displayed in the game played by operating the left controller 3 or the right controller 4.

As shown in FIG. 9, in the main game, at at least one particular position on the route until the raft (the ship) boarded by the plurality of characters reaches the goal, an item I is placed. When the item I is acquired by the player character PC1 and PC2 and the non-player characters NPC1 and NPC2 or the boarded raft coming into contact with the item I, the item I gives the right of the users to play a sub-game different from the main game. When the item I is acquired during the main game, the main game is temporarily suspended using the acquisition of the item I as a trigger, and the sub-game different from the main game is started. The sub-game includes at least one mini-game played by the plurality of users having played the main game by performing operations, and a collaboration operation representation performed in accordance with the result of the mini-game. It should be noted that the first game corresponds to, as an example, the mini-game.

FIG. 10 shows an example of a game image of the mini-game. As shown in FIG. 10, the mini-game performed by suspending the main game can be uninterruptedly played while the users belonging to the team having played the main game continue the group of teams. Thus, in the mini-game, the first user having played the main game uninterruptedly operates the left controller 3, and the second user having played the main game uninterruptedly operates the right controller 4, thereby playing the game using the same game image displayed on the stationary monitor 6. The mini-game may be any game that the plurality of users belonging to the team having played the main game can continuously cooperate to play. As an example, the mini-game may be a simple game where the player characters PC operated by the plurality of users roll a dice or turn over a card in order, or may be a game simulating the play of various sports or a scene of various sports. Further, the mini-game may be a game where at least one of the plurality of characters having appeared in the main game (e.g., the two player characters PC1 and PC2 and the non-player characters NPC1 and NPC2) appears, or may be a game where these characters do not appear. Further, in the mini-game, a game stage different from a game stage used in the main game may be used, or the same game stage as the game stage used in the main game may be used. Further, when the main game is a game operated by competing with another user team, the mini-game may also be a game where the team competes with the other user team.

It should be noted that the mini-game may be in the form in which at least one of the users belonging to the team having played the main game participates in the mini-game. For example, even if the mini-game is a game played by only one of the users belonging to the team having played the main game, a collaboration operation representation described later can also be executed using the team as a target.

As shown in FIG. 11, when the mini-game ends, the result of the mini-game is displayed on the stationary monitor 6. Then, when the result of the mini-game is an excellent result, an advantageous effect in the suspended main game is given. Here, as a case where the result of the mini-game is an excellent result, a case where an accomplishment (a score) greater than or equal to a threshold is obtained in the mini-game, a case where the team wins the mini-game, or the like is possible. Further, the advantageous effect in the main game increases or decreases a game parameter used in the main game so as to be advantageous in the progress of the main game. As an example, it is possible that the remaining time set in the main game is increased. In the example of FIG. 11, a notification is given that since the mini-game is cleared at a rank A, the remaining time of the main game increases by 30 seconds. It should be noted that the advantageous effect given when the result of the mini-game is an excellent result may be an increase in game coins used in the main game, the acquisition of an item used in the main game, an improvement in the ability of a character that appears in the main game, or the addition of points to the score of the main game. Further, even when the result of the mini-game is not an excellent result, a certain advantageous effect in the suspended main game may be given.

Further, when the result of the mini-game is an excellent result, a notification for urging the users belonging to the user team having obtained the excellent result to perform a collaboration operation. It should be noted that when a character team as a target that performs the collaboration operation includes a non-player character of which the action is controlled by the computer, each of users operating player characters on the character team except for the computer-controlled non-player character is a target that performs the collaboration operation. Here, the notification for urging the collaboration operation is a notification for urging the users on the user team of which the result of the mini-game is an excellent result to perform a predetermined operation using the left controller 3 or the right controller 4, and is given by at least one of an image and a sound. For example, in the example of FIG. 11, on the stationary monitor 6, a collaboration operation notification image N is displayed that indicates that the operation of moving the entirety of the left controller 3 or the right controller 4 held by each user by thrusting forward the left controller 3 or the right controller 4 is the operation content of the collaboration operation. Further, the characters belonging to the character team that has obtained an excellent result in the mini-game and is a target that performs the collaboration operation (the two player characters PC1 and PC2 and the non-player characters NPC1 and NPC2 in the example of FIG. 11) are displayed. It should be noted that even when the result of the mini-game is not an excellent result, the notification for urging the users belonging to the user team that has not obtained an excellent result to perform the collaboration operation may be given. Further, when the target that performs the collaboration operation is indicated, the characters belonging to the character team as the target that performs the collaboration operation may not be displayed, and as an example, the names of the users belonging to the user team having obtained an excellent result may be displayed. It should be noted that a first notification corresponds to, as an example, the collaboration operation notification image N.

Further, the collaboration operation is established by the plurality of users as the targets that perform the collaboration operation collaborating to perform operations at the same timing. Here, in a case where it is determined whether or not operations are performed at the same timing, and when operations are performed at almost the same timing overlapping a notification of a display "yeah" for urging the collaboration operation described later, it may be determined that the collaboration operation is established (a relatively strict determination). Alternatively, when operations are performed in a determination period set before and/or after the notification, it may be determined that the collaboration operation is established (a relatively generous determination). To thus urge the plurality of users to perform operations at the same timing, the collaboration operation notification image N notifies the plurality of users of a command indicating an operation timing. For example, in the example of FIG. 11, in the collaboration operation notification image N, a notification of a display "ready, set . . . " for urging preparation for the collaboration operation is given, thereby indicating to the users that the current moment is a preparatory stage immediately before the collaboration operation is performed.

Together with the notification for urging preparation for the collaboration operation, a vibration is imparted to the left controller 3 or the right controller 4 operated by each user belonging to the user team as the target that performs the collaboration operation. As described above, as a notification to the user as the target that perform the collaboration operation, not only a notification by displaying the collaboration operation notification image N or the character team as the target that performs the collaboration operation, but also a notification by imparting a vibration to the controller held by the user is given. Thus, the user holding the left controller 3 or the right controller 4 can easily understand that the user themselves is the target that performs the collaboration operation. It should be noted that the vibration imparted to the left controller 3 or the right controller 4 may end after the lapse of a period shorter than the period when, from the start of a display notification for urging preparation for the collaboration operation, the display notification continues, or may be continuously given from the start of a display notification for urging preparation for the collaboration operation until the display notification ends. It should be noted that a second notification corresponds to, as an example, a vibration to a controller held by a user.

Then, as a stage subsequent to the command indicating the operation timing when the collaboration operation is performed, then after a predetermined time since the notification for urging preparation for the collaboration operation is given, it is indicated that the current moment is the timing when the collaboration operation is performed. For example, in the example of FIG. 12, in the collaboration operation notification image N, a notification of a display "yeah" for urging the users to perform the collaboration operation is given, thereby indicating to the users that the current moment is the timing when the collaboration operation is performed.

Together with the notification for urging the users to perform the collaboration operation, a vibration is imparted again to the left controller 3 or the right controller 4 operated by each user belonging to the user team as the target that performs the collaboration operation. As described above, a vibration is imparted multiple times to the left controller 3 or the right controller 4 operated by each user as the target that performs the collaboration operation, whereby it is possible to further cause the user to notice that the user themselves is the target that performs the collaboration operation.

Then, within a predetermined threshold time since a notification of the collaboration operation including the notification for urging preparation for the collaboration operation and the notification for urging the users to perform the collaboration operation is given, when it is determined that the collaboration operation is performed by all the users as the targets that perform the collaboration operation, the indicated collaboration operation is established. It should be noted that the threshold time for determining that the collaboration operation is established may be set to a time enabling the determination that operations are performed at almost the same timing overlapping the notification for urging the users to perform the collaboration operation (a time for making a relatively strict determination), or may be set to a relatively long time including the timing of the notification and a period before and/or after the notification (a time for making a relatively generous determination). Further, when a character team as a target that performs the collaboration operation includes a non-player character of which the action is controlled by the computer, each of users operating player characters on the character team except for the computer-controlled non-player character is a target that performs the collaboration operation. For example, in the example of FIG. 12, in accordance with the notification for urging the users to perform the collaboration operation, the first user as the target that performs the collaboration operation performs the operation of thrusting forward the left controller 3, and the second user performs the operation of thrusting forward the right controller 4. Thus, it is determined that the collaboration operation is established. For example, the determination of whether or not the collaboration operation for moving the left controller 3 and the right controller 4 is performed can be made based on an acceleration generated in each controller (specifically, the detection results of the acceleration sensor 104 and the acceleration sensor 114) and/or an angular velocity generated in each controller (specifically, the detection results of the angular velocity sensor 105 and the angular velocity sensor 115). For example, in each controller as a target that performs the collaboration operation, when the state where a change in the acceleration is greater than a first threshold and a change in the angular velocity from a predetermined time before (e.g., 20 frames before) is smaller than a second threshold occurs within the threshold time, it can be determined that the collaboration operation is performed using the controller. Then, when it is determined that the collaboration operation is performed using all the controllers as the targets that perform the collaboration operation, it is determined that the collaboration operation by all the users as the targets that perform the collaboration operation is successful. Further, when it is determined that the collaboration operation is not performed by at least one of the controllers as the targets that perform the collaboration operation, it is determined that the collaboration operation by all the users as the targets that perform the collaboration operation is failed.

It should be noted that the notification of the collaboration operation can be repeated multiple times. For example, after the lapse of a predetermined time since the notification for urging preparation for the collaboration operation and the notification for urging the users to perform the collaboration operation are given, the notification for urging preparation for the collaboration operation and the notification for urging the users to perform the collaboration operation may be given again. In this case, also the notifications by the vibrations to the left controller 3 and the right controller 4 are also given together with the repeated notification of the collaboration operation. As an example, the display "ready, set . . . " for urging preparation for the collaboration operation and the display "yeah" for urging the users to perform the collaboration operation may be switched in a predetermined cycle (e.g., every second), and each of the displays may be repeated a predetermined number of times (e.g., three times). In this case, if the collaboration operation is not successful in the period from when the notification of the first display "ready, set . . . " for urging preparation for the collaboration operation is given to when the notification of the last display "yeah" for urging the users to perform the collaboration operation is given and a predetermined time elapses (e.g., a second elapses), i.e., within a period of 7 seconds from the notification of the first display "ready, set . . . " for urging preparation for the collaboration operation, it may be determined that the collaboration operation is failed. The notification of the collaboration operation is thus repeated multiple times, whereby it is possible to further cause the user to notice that the user themselves is the target that performs the collaboration operation.

Further, the operation content of the collaboration operation may be another operation content. As a first example, the operation of moving the entirety of the left controller 3 or the right controller 4 held by each user by thrusting upward the left controller 3 or the right controller 4 (a high-five operation) may be the operation content of the collaboration operation. As a second example, the operation of moving the entirety of the left controller 3 or the right controller 4 by thrusting forward the left controller 3 or the right controller 4 or bringing the left controller 3 or the right controller 4 close to the body of the user in the state where the orientation of the left controller 3 or the right controller 4 is changed such that the longitudinal direction of the left controller 3 or the right controller 4 held by the user is the up-down direction (a thumbs-up operation) may be the operation content of the collaboration operation. As a third example, the operation of quickly moving the left controller 3 or the right controller 4 held by the user in the down direction from an upper portion once or more (a fist-pump operation) may be the operation content of the collaboration operation. As a fourth example, the operation of swinging the left controller 3 or the right controller 4 held by the user to the left and right (the operation of waving the hand of the user) may be the operation content of the collaboration operation. Further, in any of the examples, the operation of bringing the left controller 3 held by a user into contact with the right controller 4 held by another user may be the operation content of the collaboration operation. Further, the operation content of the collaboration operation may be the combination of different operation contents. As an example, the combination of operation contents in which, after a high-five operation is performed, a thumbs-up operation is performed may be the operation content of the collaboration operation. Even with the operation contents of such various collaboration operations, determination criteria are set in accordance with the operation contents, whereby based on an acceleration generated in each controller, the history of the acceleration, an angular velocity generated in the controller, the history of the angular velocity, the orientation of the controller based on a gravitational acceleration capable of being calculated based on the acceleration and/or the angular velocity, and the like, it is possible to determine whether or not the collaboration operation is performed. It should be noted that the operation content of the collaboration operation may not be an operation content in which the main body of the left controller 3 or the main body of the right controller 4 is moved, and may be a button operation (e.g., a pressing operation on an operation button), a tilt operation (e.g., a tilt operation on an analog stick), or the like.

Further, in the above description, an example has been used where vibrations are imparted to the left controller 3 and the right controller 4 together with the notification for urging the collaboration operation. Alternatively, another stimulus may be imparted to each of the left controller 3 and the right controller 4 together with the notification for urging the collaboration operation. As an example, together with the notification for urging the collaboration operation, at least a part of the housing 31 or 51 of the left controller 3 or the right controller 4 operated by each user belonging to the user team as the target that performs the collaboration operation may deform (e.g., swell), thereby imparting a stimulus to the user. As another example, together with the notification for urging the collaboration operation, an operation button or a stick of the left controller 3 or the right controller 4 operated by each user belonging to the user team as the target that performs the collaboration operation may move (e.g., protrude), thereby imparting a stimulus to the user. Even when a stimulus different from the vibration is thus imparted to a contact body of the left controller 3 or the right controller 4 (the hand of the user holding the left controller 3 or the right controller 4), it is possible to urge the collaboration operation by a method different from display and a sound.

Further, together with the notification for urging the collaboration operation, a stimulus may not be imparted from each of the left controller 3 and the right controller 4 to the contact body. Even with the notification for urging the collaboration operation by display or a sound alone, the user can recognize that the collaboration operation is urged. Even if a stimulus is not imparted from each of the left controller 3 and the right controller 4, the user can notice that the user themselves is the target that performs the collaboration operation.

Further, the users as the targets that perform the collaboration operation may be a single user belonging to the user team of which the result of the mini-game is an excellent result. For example, it is also possible that a particular user included in the users belonging to the user team is excluded from the targets that perform the collaboration operation. As a result, a single user belonging to the user team can be a target that performs the collaboration operation.

As shown in FIG. 13, when it is determined that the collaboration operation by all the users as the targets that perform the collaboration operation is successful, a collaboration operation success representation is performed. For example, in the collaboration operation success representation, the characters belonging to the character team as the target that performs the collaboration operation (the two player characters PC1 and PC2 and the non-player characters NPC1 and NPC2 in the example of FIG. 13) perform actions corresponding to user actions in the collaboration operation performed by the users. As an example, when the collaboration operation for thrusting forward each controller is performed, the actions of the player character PC1 and PC2 and the non-player characters NPC1 and NPC2 gathering at the center of the screen and performing actions simulating user actions in the collaboration operation (e.g., the action of thrusting forward one hand with each other, or the action of fist-bumping each other, or the action of high-fiving each other) are performed, whereby the collaboration operation success representation is performed. It should be noted that the action of each character in the collaboration operation success representation may not correspond to the motion made by the user in the collaboration operation, and may simply be the action of the character being delighted that the collaboration operation is successful. It should be noted that a predetermined game representation performed when it is determined that a success condition is satisfied corresponds to, as an example, the collaboration operation success representation.

Then, when it is determined that the collaboration operation by all the users as the targets that perform the collaboration operation is successful, an advantageous effect in the suspended main game is further given. The advantageous effect given when the collaboration operation is successful also increases or decreases a game parameter used in the main game so as to be advantageous in the progress of the main game. Thus, similarly to when the mini-game is ended, it is possible that the remaining time set in the main game is increased. In the example of FIG. 13, a notification is given that in accordance with the success of the collaboration operation, the remaining time of the main game further increases by 3 seconds. It should be noted that the advantageous effect given when the collaboration operation is successful may be different from the effect given in accordance with the result of the mini-game. Further, the advantageous effect given when the collaboration operation is successful may be an increase in game coins used in the main game, the acquisition of an item used in the main game, an improvement in the ability of a character that appears in the main game, or the addition of points to the score of the main game. It should be noted that the predetermined game representation performed when it is determined that the success condition is satisfied corresponds to, as another example, a representation giving a notification that the advantageous effect in the main game is further given (e.g., the remaining time of the main game is increased).

Figure 14:
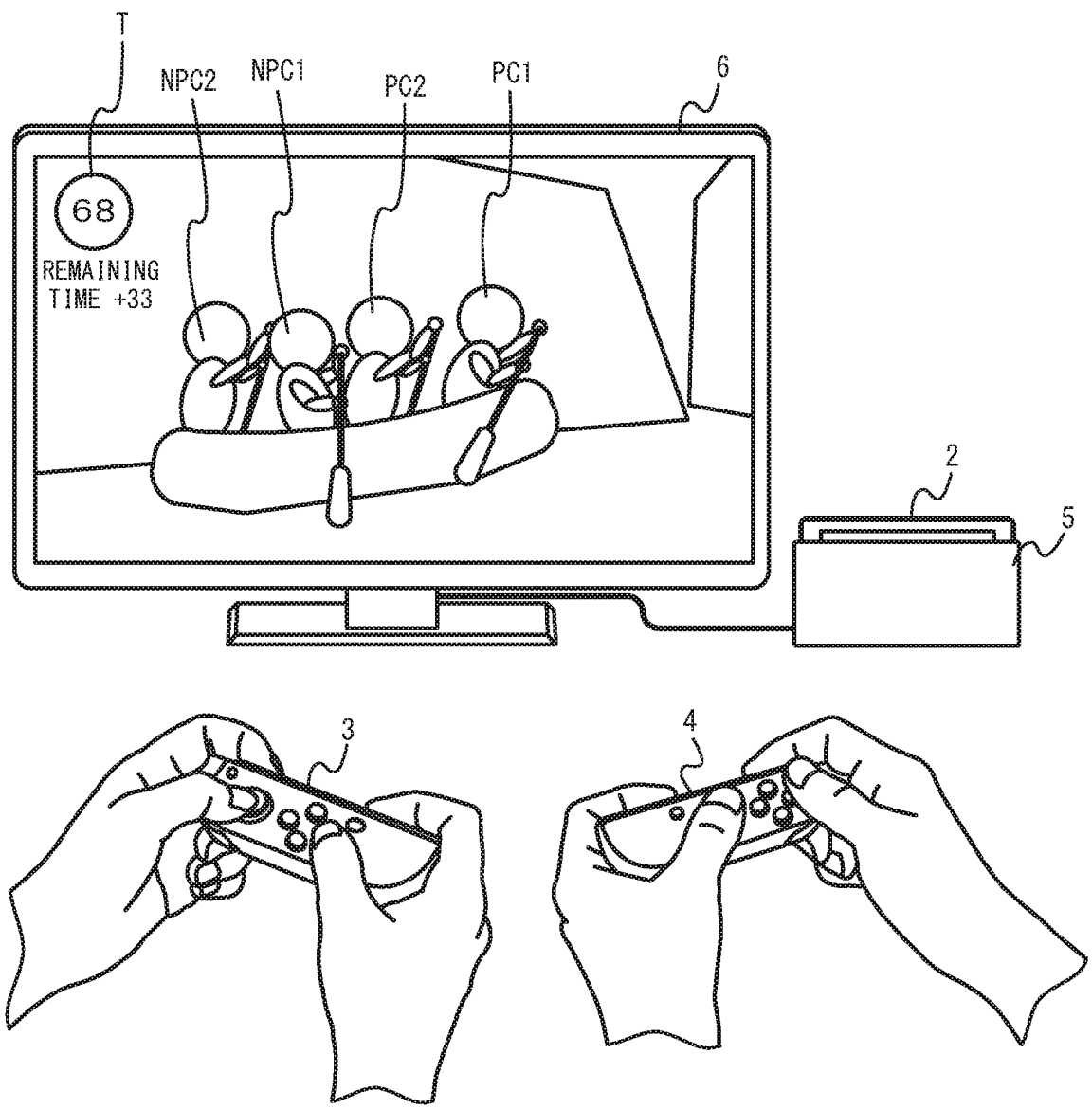
FIG. 14 is a non-limiting example of a game image displayed in the game played by operating the left controller 3 or the right controller 4.

As shown in FIG. 14, when the sub-game including the mini-game and the collaboration operation representation performed in accordance with the result of the mini-game ends, the game returns to the suspended main game, and the game play is resumed. Then, when the advantageous effects are obtained in the sub-game, the advantageous effects are reflected on the resumed main game. For example, in the example of FIG. 14, the effect of increasing the remaining time of the main game by 33 seconds (an effect obtained by adding up the effect of increasing the remaining time by 30 seconds in the mini-game and the effect of increasing the remaining time by 3 seconds in the collaboration operation representation) is obtained in the sub-game. Thus, the remaining time indicated by the remaining time notification image T increases from 35 seconds when the main game is suspended to 68 seconds, and a notification is given that the remaining time increases by 33 seconds.

It should be noted that in the period when the collaboration operation by all the users as the targets that perform the collaboration operation is not yet successful, the characters belonging to the character team as the target that performs the collaboration operation may perform the action of waiting for the collaboration operation. For example, when some of the users as the targets that perform the collaboration operation perform the collaboration operation, it is possible that the player characters PC operated by the users perform the actions of waiting for the collaboration operation of other users. As an example, when the actions of the player characters PC simulating user actions in the collaboration operation are the actions of high-fiving each other, the actions of bending down before the player characters PC jump can be performed as the actions of waiting for the collaboration operation of the other users. Further, when the failure of the collaboration operation by all the users as the targets that perform the collaboration operation is finalized, it is possible that all the characters belonging to the character team as the target that performs the collaboration operation perform the actions of being disappointed.

Further, when at least one of the users as the targets that perform the collaboration operation performs the collaboration operation, it may be determined that the collaboration operation is successful. In this case, in accordance with the number of people that perform the collaboration operation according to the determination, the degree of the advantageous effect to be given may increase or decrease.

Further, the timing when the collaboration operation is urged may be not only immediately after the mini-game ends, but also immediately before the mini-game starts or in the middle of the mini-game. For example, when the collaboration operation is urged immediately before the mini-game starts, a representation for instigating a sense of togetherness may be performed before the mini-game starts. It should be noted that when the collaboration operation is urged immediately before the mini-game starts, then in accordance with the fact that the collaboration operation is successful, the advantageous effect in the mini-game performed after the collaboration operation may be given. Thus, even in a game form including only the sub-game without the main game, it is possible to obtain the effect of the collaboration operation. Further, when the collaboration operation is urged in the middle of the mini-game, it is possible that the collaboration operation is urged at the time when an event effective in advancing the mini-game occurs in the middle of the mini-game. Here, as the time when an effective event occurs, in a mini-game simulating a sport, the time where a point is obtained, the time when a point of an opposing team is prevented, or the like is possible. In a mini-game where the user fights against an enemy, the time when the user defeats the enemy, the time when the user defends against an attack of the enemy, or the like is possible.

Further, in the above description, as an example of the main game, a rafting game where a plurality of characters board a ship toward a goal before the remaining time is 0 is used. However, it goes without saying that the main game may be another game. For example, when a sugoroku game where player characters operated by a plurality of users roll a dice and advance in order is the main game, it is possible that in accordance with a sugoroku square at which each player character stops, game coins increase or decrease, and in accordance with the fact that each player character stops at a particular sugoroku square or every time a turn elapses, the sub-game is performed. Then, in accordance with the result of the mini-game or the collaboration operation, the game coins further increase.

Next, with reference to FIGS. 15 to 19, a description is given of an example of a specific process executed by the game system 1 in the exemplary embodiment. FIG. 15 is a diagram showing an example of a data area set in the DRAM 85 of the main body apparatus 2 in the exemplary embodiment. It should be noted that in the DRAM 85, in addition to the data shown in FIG. 15, data used in another process is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, angular velocity data Db, acceleration data Dc, group-of-teams data Dd, remaining time data De, waiting-for-operation time data Df, vibration data Dg, sub-game flag data Dh, mini-game flag data Di, waiting-for-operation flag data Dj, character action data Dk, image data Dm, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each of the input sections (specifically, each button, each analog stick, and each sensor). In the exemplary embodiment, operation data is transmitted in a predetermined cycle from each of the left controller 3 and/or the right controller 4 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication.

The angular velocity data Db is data indicating angular velocities generated in each of the left controller 3 and the right controller 4. For example, the angular velocity data Db includes data indicating angular velocities about the xyz axes generated in each of the left controller 3 and the right controller 4, and the like.

The acceleration data Dc is data indicating accelerations generated in each of the left controller 3 and the right controller 4. For example, the acceleration data Dc includes data indicating accelerations in the xyz axis directions generated in the each of the left controller 3 and the right controller 4, and the like.

The group-of-teams data Dd is data indicating each of character teams that perform a game, and is data indicating a group of teams including at least one team including player characters PC operated by a plurality of users among the teams. In the group-of-teams data Dd, player characters PC belonging to each character team, non-player characters NPC belonging to each character team, identification information regarding controllers used to operate the player characters PC, and the like are managed.

The remaining time data De is data indicating the remaining time allowed until the goal is reached in the main game (the time limit until the goal is reached). The waiting-for-operation time data Df is data indicating the time in which the performance of the collaboration operation by a plurality of users is waited for.

The vibration data Dg is data indicating a vibration for vibrating each of the left controller 3 and/or the right controller 4.

The sub-game flag data Dh is data indicating a sub-game flag that is set to on when the sub-game is performed. The mini-game flag data Di is data indicating a mini-game flag that is set to on when the mini-game is performed. The waiting-for-operation flag data Dj is data indicating a waiting-for-operation flag that is set to on in the period when the collaboration operation by a plurality of users is waited for.

The character action data Dk is data indicating each of the positions, the directions, the orientations, the actions, and the like of each player character PC and each non-player character NPC in a virtual space.

The image data Dm is data for displaying images (e.g., an image of a player character, an image of a virtual object, a field image, a background image, and the like) on the display 12 of the main body apparatus 2 or a display screen of the stationary monitor 6 when a game is performed.

Figure 16:
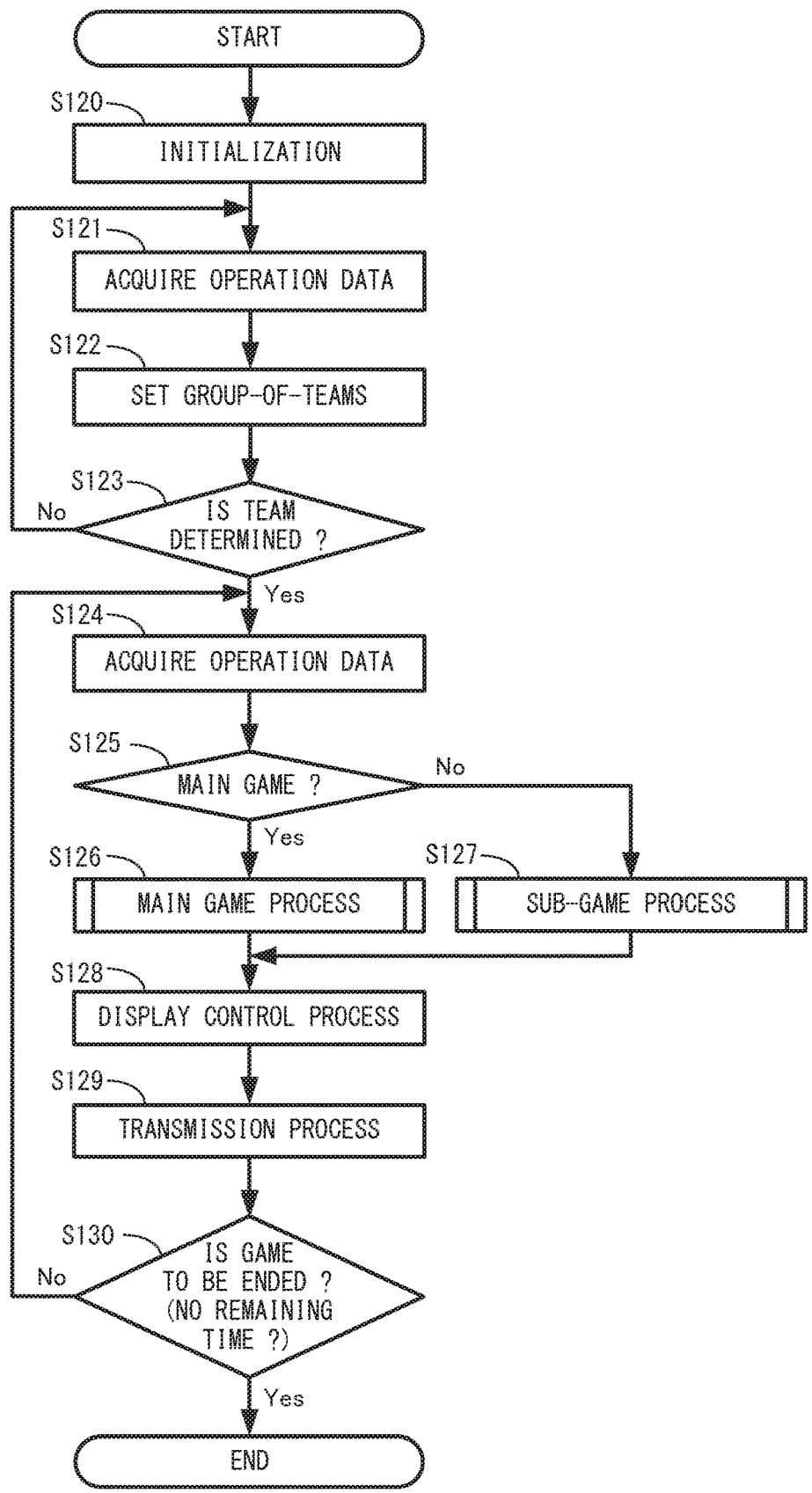
FIG. 16 is a flow chart showing a non-limiting example of game processing executed by the game system 1.
Figure 17:
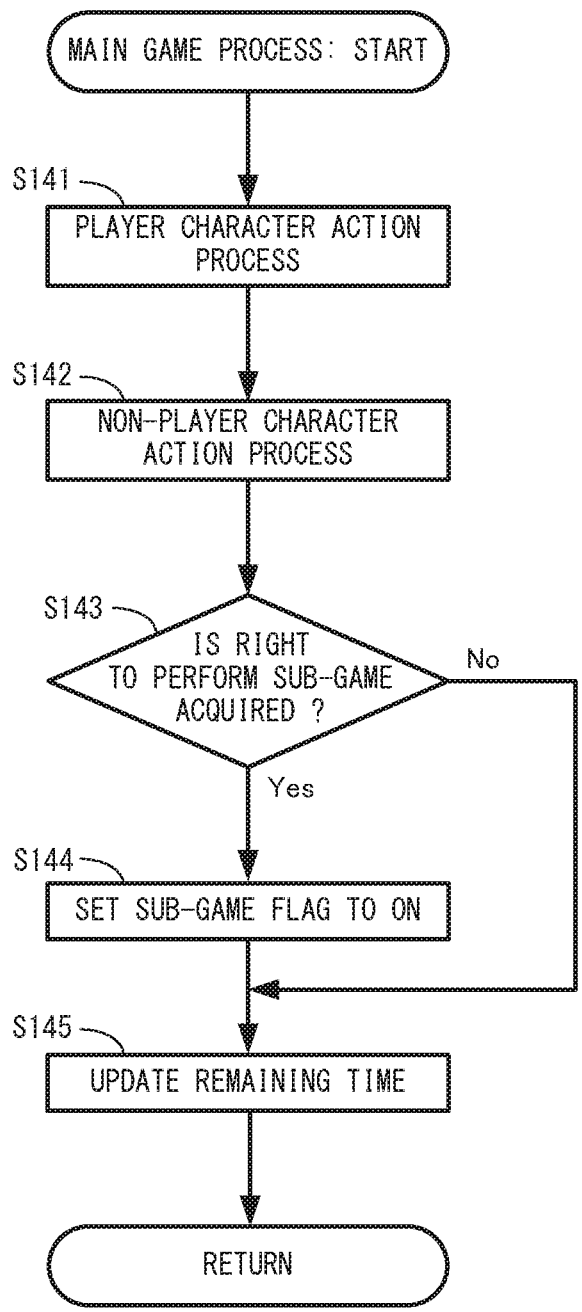
FIG. 17 is a subroutine showing non-limiting examples of the details of a main game process performed in step S126 in FIG. 16.
Figure 18:
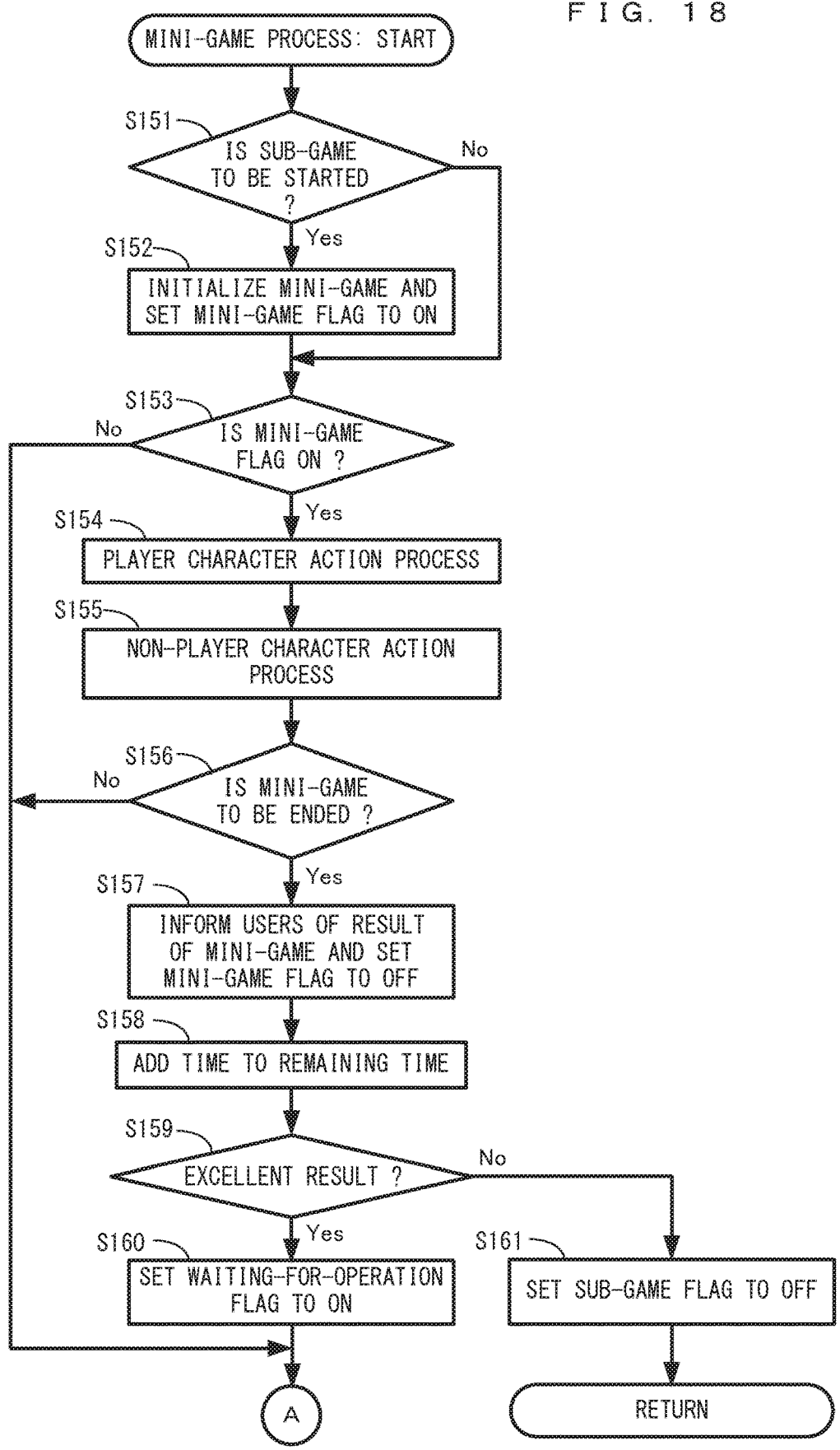
FIG. 18 is a subroutine showing non-limiting examples of the details of the first half of a sub-game process performed in step S127 in FIG. 16.
Figure 19:
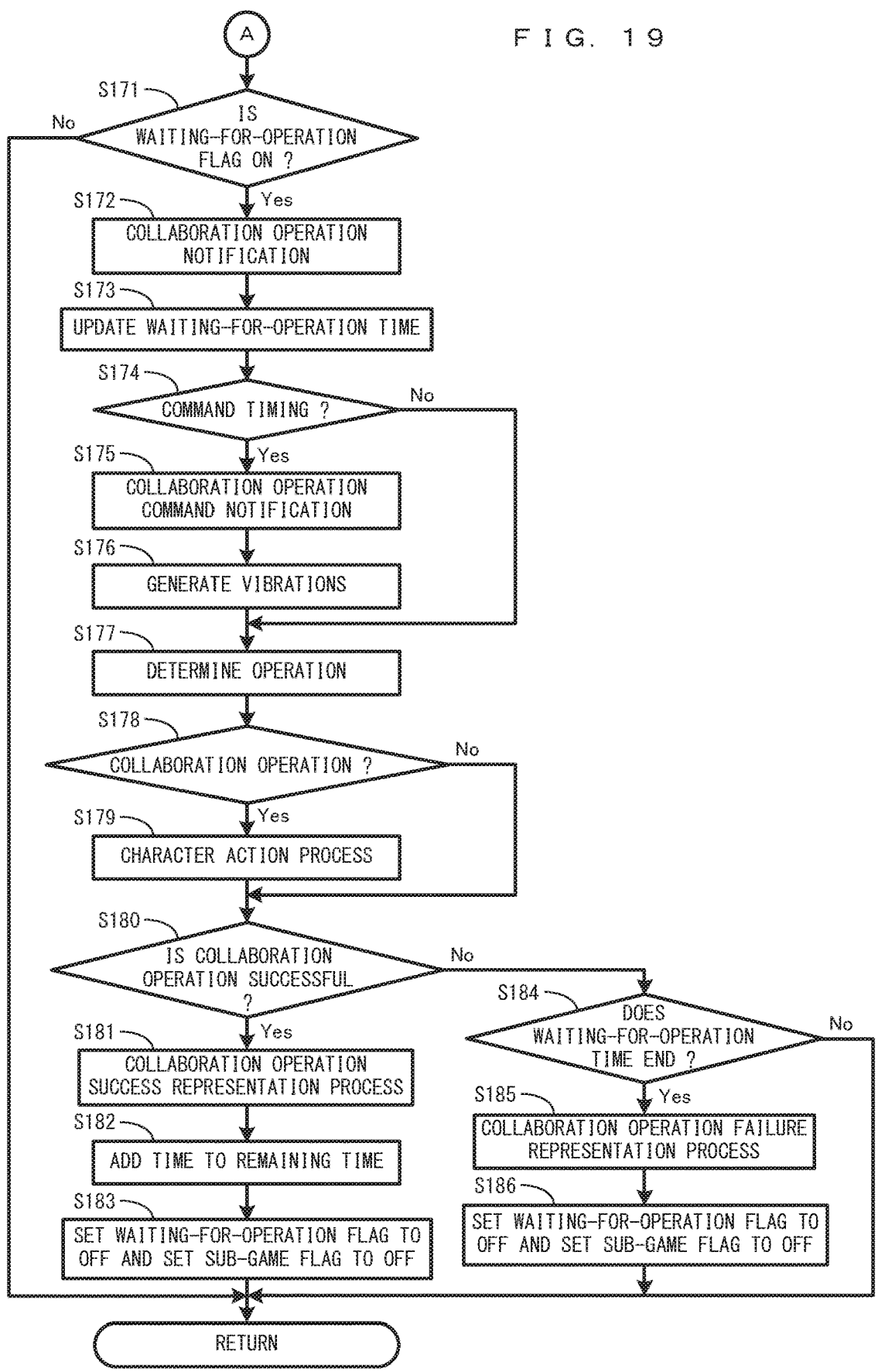
FIG. 19 is a subroutine showing non-limiting examples of the details of the second half of the sub-game process performed in step S127 in FIG. 16.

Next, with reference to FIGS. 16 to 19, a detailed example of information processing (game processing) according to the exemplary embodiment is described. FIG. 16 is a flow chart showing an example of game processing executed by the game system 1. FIG. 17 is a subroutine showing an example of the details of a main game process performed in step S126 in FIG. 16. FIG. 18 is a subroutine showing examples of the details of the first half of a sub-game process performed in step S127 in FIG. 16. FIG. 19 is a subroutine showing examples of the details of the second half of the sub-game mode game process performed in step S127 in FIG. 16. In the exemplary embodiment, a series of processes shown in FIGS. 16 to 19 is performed by the processor 81 executing a communication program or a predetermined application program (a game program) included in the various programs Pa. Further, the information processing shown in FIGS. 16 to 19 is started at any timing.

It should be noted that the processes of all of the steps in the flow charts shown in FIGS. 16 to 19 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 16 to 19 may be executed by the cooperation of a plurality of information processing apparatuses including the main body apparatus 2.

In FIG. 16, the processor 81 performs initialization in the game processing (step S120), and the processing proceeds to the next step. For example, in the initialization, the processor 81 initializes parameters for performing the processing described below. As an example, the processor 81 initializes each of the sub-game flag indicated by the sub-game flag data Dh, the mini-game flag indicated by the mini-game flag data Di, and the waiting-for-operation flag indicated by the waiting-for-operation flag data Dj to off.

Next, the processor 81 acquires operation data from each of the left controller 3 and/or the right controller 4 and updates the operation data Da (step S121), and the processing proceeds to the next step.

Next, based on the operation data acquired in the above step S121, the processor 81 performs the process of setting a group of teams for playing the main game and the sub-game (step S122), and the processing proceeds to the next step. Here, the processor 81 sets a group of teams including at least one team composed of a plurality of users who play the main game and the sub-game, and sets a character team to which a plurality of player characters PC operated by the plurality of users belong. Then, the processor 81 updates the group-of-teams data Dd using information regarding player characters PC belonging to each character team, information regarding non-player characters NPC belonging to each character team, identification information regarding controllers used to operate the player characters PC, and the like. Thus, in the group of teams, a single character team to which a plurality of player characters PC operated by a plurality of users belong can be set, or a plurality of character teams to which a plurality of player characters PC operated by a plurality of users belong can be set, or a character team to which a plurality of player characters PC operated by a plurality of users belong and a character team to which only non-player characters NPC automatically controlled by the computer (the processor 81) belong can be set. Further, to a character team to which a plurality of player characters PC operated by a plurality of users belong, a non-player character NPC automatically controlled by the computer may belong. In the following description, a description is given of a process in a case where a character team to which a plurality of player characters PC operated by a plurality of users belong performs the main game and the sub-game.

Next, the processor 81 determines whether or not the group of teams is determined (step S123). For example, when the operation data acquired in the above step S121 indicates that the group of teams is determined, the determination of the processor 81 is affirmative in the above step S123. Then, when the group of teams is determined, the processor 81 sets the initial states of a game field for playing the main game and the player characters PC and/or the non-player characters NPC on the game field, thereby updating the character action data Dk. Then, the processing proceeds to step S124. On the other hand, when the group of teams is not determined, the processing returns to step S121, and the processor 81 repeats step S121.

In step S124, the processor 81 acquires operation data from the left controller 3 and/or the right controller 4 and updates the operation data Da, and the processing proceeds to the next step.

Next, the processor 81 determines whether or not the main game is to be performed (step S125). For example, when the sub-game flag indicated by the sub-game flag data Dh is set to off, the determination of the processor 81 is affirmative in the above step S125. Then, when the main game is to be performed, the processing proceeds to step S126. On the other hand, when the sub-game is to be performed, the processing proceeds to step S127.

In step S126, the processor 81 performs a main game process, and the processing proceeds to step S128. With reference to FIG. 17, a description is given below of an example of the main game process performed in the above step S126. It should be noted that second game execution means executes a second game different from a first game, and as an example, corresponds to the processor 81 that performs the process of step S126.

In FIG. 17, the processor 81 performs a player character action process in the main game (step S141), and the processing proceeds to the next step. For example, the processor 81 sets an instruction content indicated by each of the pieces of operation data of the plurality of users (e.g., the first user and the second user) acquired in the above step S124, causes the plurality of player characters PC belonging to the character team performing the main game (e.g., the first player character PC1 operated by the first user and the second player character PC2 operated by the second user) to perform actions in accordance with the instruction content, and sets each of the positions, the directions, the orientations, the actions, and the like of the plurality of player characters PC in the virtual space, thereby updating the character action data Dk.

Next, the processor 81 performs a non-player character action process in the main game (step S142), and the processing proceeds to the next step. For example, in accordance with the actions of the player characters PC set in the above step S141, the processor 81 causes the plurality of non-player characters NPC belonging to the character team performing the main game (e.g., the non-player characters NPC1 and NPC2) to perform actions, and sets each of the positions, the directions, the orientations, the actions, and the like of the plurality of non-player characters NPC in the virtual space, thereby updating the character action data Dk.

Next, the processor 81 determines whether or not the character team performing the main game acquires the right to execute the sub-game (step S143). For example, when the player characters PC and the non-player characters NPC belonging to the character team performing the main game, a virtual object moved by the character team (e.g., a raft boarded by the character team), or the like comes into contact with an item I, the determination of the processor 81 is affirmative in the above step S143. Then, when the right to execute the sub-game is acquired, the processor 81 suspends the main game that is being executed, and the processing proceeds to step S144. On the other hand, when the right to execute the sub-game is not acquired, the processing proceeds to step S145.

In step S144, the processor 81 sets the sub-game flag to on, and the processing proceeds to step S145. For example, the processor 81 changes the sub-game flag indicated by the sub-game flag data Dh to on, thereby updating the sub-game flag.

In step S145, the processor 81 decreases the remaining time set in the main game of the character team by a predetermined time, thereby updating the remaining time. Then, the processing of this subroutine ends. For example, the processor 81 subtracts the cycle of processing executed by the game system 1 (e.g., a time corresponding to a single frame) from the remaining time indicated by the remaining time data De and updates the remaining time data De using the remaining time after the subtraction.

Referring back to FIG. 16, when it is determined in the above step S125 that the sub-game is to be performed, the processor 81 performs a sub-game process (step S127), and the processing proceeds to step S128. With reference to FIGS. 18 and 19, a description is given below of an example of the sub-game process performed in the above step S127.

In FIG. 18, the processor 81 determines whether or not the current moment is the timing when the sub-game of the character team is started (step S151). For example, when the current moment is immediately after the sub-game flag of the sub-game flag data Dh is changed to on, the determination of the processor 81 is affirmative in the above step S151. Then, when the current moment is the timing when the sub-game is started, the processing proceeds to step S152. On the other hand, when the sub-game is already started, the processing proceeds to step S153.

In step S152, the processor 81 stores the situation of the suspended main game of the character team and also initializes the mini-game to be performed by the character team, and the processing proceeds to step S153. For example, the processor 81 sets the initial states of a game field for playing the mini-game and the player characters PC and/or the non-player characters NPC belonging to the character team on the game field, where necessary, thereby updating the character action data Dk. Further, the processor 81 changes the mini-game flag indicated by the mini-game flag data Di to on, thereby initializing the mini-game flag.

In step S153, the processor 81 determines whether or not the mini-game flag is set to on. For example, when the mini-game flag indicated by the mini-game flag data Di is set to on, the determination of the processor 81 is affirmative in the above step S153. Then, when the mini-game flag is set to on, the processing proceeds to step S154. On the other hand, when the mini-game flag is set to off, the processing proceeds to step S171 (see FIG. 19).

In step S154, the processor 81 performs a player character action process on the player characters belonging to the character team performing the mini-game, and the processing proceeds to the next step. For example, the processor 81 sets an instruction content indicated by each of the pieces of operation data of the plurality of users (e.g., the first user and the second user) acquired in the above step S124, causes the plurality of player characters PC belonging to the character team performing the mini-game (e.g., the first player character PC1 operated by the first user and the second player character PC2 operated by the second user) to perform actions in accordance with the instruction content, and sets each of the positions, the directions, the orientations, the actions, and the like of the plurality of player characters PC in the virtual space, thereby updating the character action data Dk.

Next, the processor 81 performs a non-player character action process on the non-player characters belonging to the character team performing the mini-game (step S155), and the processing proceeds to the next step. For example, in accordance with the actions of the player characters PC set in the above step S154, the processor 81 causes the plurality of non-player characters NPC belonging to the character team performing the mini-game (e.g., the non-player characters NPC1 and NPC2) to perform actions, and sets each of the positions, the directions, the orientations, the actions, and the like of the plurality of non-player characters NPC in the virtual space, thereby updating the character action data Dk. It should be noted that first game execution means sets a group of teams including at least one team composed of a plurality of users and executes a first game played by at least one user belonging to the team. The first game execution means corresponds to, as an example, the processor 81 that performs the processes of steps S152, S154, and S155.

Next, the processor 81 determines whether or not the mini-game of the character team is to be ended (step S156). Examples of a condition for ending the mini-game in the above step S156 include the fact that the result of the mini-game is finalized, the fact that a user performs the operation of ending the mini-game, and the like. When the mini-game is to be ended, the processing proceeds to step S157. When the mini-game is not to be ended, the processing proceeds to step S171 (see FIG. 19).

In step S157, the processor 81 performs the process of informing the users of the result of the mini-game of the character team and ending the mini-game, and the processing proceeds to the next step. For example, the processor 81 calculates the rank at which the mini-game is cleared or the result that the clearing of the mini-game is failed, generates an image indicating the rank at which the mini-game is cleared or the result that the clearing of the mini-game by the character team is failed, and displays the image on the display device in a display control process in step S128 described later (e.g., the stationary monitor 6) (see FIG. 11). Further, the processor 81 performs the process of changing the mini-game flag indicated by the mini-game flag data Di to off and ending the mini-game of the character team.

Next, the processor 81 adds a time based on the result of the mini-game of the character team to the remaining time set in the main game of the character team, thereby updating the remaining time (step S158). Then, the processing proceeds to the next step. For example, when the result of the mini-game leads to the addition of the time to the remaining time, the processor 81 adds the time to be added to the remaining time indicated by the remaining time data De and updates the remaining time data De using the remaining time after the addition. Further, when the time is added to the remaining time in accordance with the result of the mini-game, the processor 81 generates an image informing the character team that the time is added to the remaining time for the character team. Then, the processor 81 displays the image on the display device (e.g., the stationary monitor 6) (see FIG. 11) in the display control process in step S128 described later. It should be noted that depending on the result of the mini-game, the time may not be added to the remaining time set in the main game. In this case, the processor 81 does not update the remaining time data De and does not generate an image informing the character team that the time is added to the remaining time, either. Further, the timing when the state where the time based on the result of the mini-game of the character team is actually added to the remaining time set in the main game of the character team is indicated to the users may be immediately before the main game is resumed, or immediately after the mini-game is resumed.

Next, the processor 81 determines whether or not the result of the mini-game of the character team is an excellent result (step S159). Here, as a case where the result of the mini-game is an excellent result, a case where an accomplishment greater than or equal to a threshold (the clearing of the mini-game at a predetermined rank or higher or the acquisition of points greater than or equal to a predetermined threshold) is obtained in the mini-game, a case where the character team wins the mini-game, or the like is possible. When any of these conditions is satisfied, the determination of the processor 81 is affirmative in the above step S159. Then, when the result of the mini-game is an excellent result, the processing proceeds to step S160. On the other hand, when the result of the mini-game is not an excellent result, the processing proceeds to step S161.

In step S160, the processor 81 changes the waiting-for-operation flag to on, and the processing proceeds to step S171 (see FIG. 19). For example, the processor 81 changes the waiting-for-operation flag indicated by the waiting-for-operation flag data Dj to on, thereby updating the waiting-for-operation flag.

On the other hand, in step S161, the processor 81 sets the sub-game flag to off, and the processing of this subroutine ends. For example, the processor 81 changes the sub-game flag indicated by the sub-game flag data Dh to off, thereby updating the sub-game flag. Further, the processor 81 performs the process of reading the situation of the suspended main game of the character team and resuming the main game. It should be noted that when the remaining time indicated by the remaining time data De is changed as compared with when the main game of the character team is suspended, the processor 81 generates the remaining time notification image T for informing the character team of the change and displays the image on the display device (e.g., the stationary monitor 6) (see FIG. 14) in the display control process in step S128 described later.

With reference to FIG. 19, in step S171, the processor 81 determines whether or not the waiting-for-operation flag is set to on. For example, when the waiting-for-operation flag indicated by the waiting-for-operation flag data Dj is set to on, the determination of the processor 81 is affirmative in the above step S171. Then, when the waiting-for-operation flag is set to on, the processing proceeds to step S172. On the other hand, when the waiting-for-operation flag is set to off, the processing of this subroutine ends.

In step S172, the processor 81 performs the process of notifying the users on the character team of the operation content of the collaboration operation, and the processing proceeds to the next step. For example, when the operation of moving the entirety of the left controller 3 or the right controller 4 held by each user by thrusting forward the left controller 3 or the right controller 4 is the operation content of the collaboration operation, the collaboration operation notification image N indicating the operation content to the users on the character team is generated and displayed on the display device (e.g., the stationary monitor 6) (see FIGS. 11 and 12) in the display control process in step S128 described later. It should be noted that first notification means outputs, at least before the first game is started, when the first game is suspended, or after the first game is ended, a signal for giving a first notification for, by at least one of an image and a sound, urging a user on a team to perform the operation of moving the entirety of a controller. The first notification means corresponds to, as an example, the processor 81 that performs the processes of steps S172 and S175.

Next, the processor 81 increases by a predetermined time a waiting-for-operation time in which the collaboration operation of the users on the character team is waited for, thereby updating the waiting-for-operation time (step S173). Then, the processing proceeds to the next step. For example, the processor 81 adds the cycle of processing executed by the game system 1 to the waiting-for-operation time indicated by the waiting-for-operation time data Df (e.g., a time corresponding to a single frame) and updates the waiting-for-operation time data Df using the waiting-for-operation time after the addition.

Next, the processor 81 determines whether or not the current moment is a command timing when a command indicating the operation timing of the collaboration operation of the users on the character team is given (step S174). For example, when the waiting-for-operation time indicated by the waiting-for-operation time data Df is a time corresponding to the command timing determined in advance, the determination of the processor 81 is affirmative in the above step S174. Then, when the current moment is the command timing, the processing proceeds to step S175. On the other hand, when the current moment is not the command timing, the processing proceeds to step S177.

In step S175, the processor 81 performs the process of notifying the users on the character team of collaboration operation command indicating the operation timing of the collaboration operation, and the processing proceeds to the next step. For example, in accordance with the waiting-for-operation time indicated by the waiting-for-operation time data Df, the processor 81 generates a notification for urging the character team to prepare for the collaboration operation (the display "ready, set . . . " illustrated in FIG. 11) or the collaboration operation notification image N indicating a notification for urging the character team to perform the collaboration operation (the display "yeah" illustrated in FIG. 12) and displays the image on the display device (e.g., the stationary monitor 6) (see FIGS. 11 and 12) in the display control process in step S128 described later.

Next, the processor 81 performs the process of generating vibration data (step S176), and the processing proceeds to step S177. For example, the processor 81 sets vibration waveforms (vibration patterns) indicating targets that perform the collaboration operation, and based on the vibration waveforms, generates vibration data for vibrating the controllers operating the player characters PC belonging to the character team, thereby updating the vibration data Dg. As an example, when the left controller 3 operated by the first user and the right controller 4 operated by the second user are targets that perform the collaboration operation, vibration data for vibrating the left controller 3 and the right controller 4 by vibration waveforms (vibration patterns) indicating targets that perform the collaboration operation is set in the vibration data Dg as vibration data to be transmitted to the left controller 3 operated by the first user and the right controller 4 operated by the second user. Then, the vibration data is transmitted to the left controller 3 and the right controller 4 as the targets that perform the collaboration operation in the transmission process in step S129 described later, whereby the left controller 3 operated by the first user and the right controller 4 operated by the second user vibrate by the vibration patterns. It should be noted that second notification means outputs, to a controller operated by a user belonging to a team, a signal for giving, together with a first notification, a second notification for stimulating a contact body that comes into contact with the controller. The second notification means corresponds to, as an example, the processor 81 that performs the process of step S176.

In step S177, the processor 81 determines an operation, and the processing proceeds to the next step. For example, the processor 81 analyzes an operation content using each controller as the target that performs the collaboration operation. As an example, with reference to the angular velocity data Db and the acceleration data Dc, and based on an acceleration generated in each controller as the target that performs the collaboration operation and the history of the acceleration and/or an angular velocity generated in the controller and the history of the angular velocity, the processor 81 analyzes an operation content using the controller.

Next, using the controllers as the targets that perform the collaboration operation, the processor 81 determines whether or not the collaboration operation is performed (step S178). For example, when the operation of moving the entirety of the left controller 3 or the right controller 4 by thrusting forward the left controller 3 or the right controller 4 is the operation content of the collaboration operation, the processor 81 determines that the collaboration operation is performed on a controller in which a change in the acceleration is greater than a first threshold and a change in the angular velocity from a predetermined time before (e.g., 20 frames before) is smaller than a second threshold. Then, when there is at least one controller used to perform the collaboration operation at the current moment according to a determination among the controllers as the targets that perform the collaboration operation, the processing proceeds to step S179. On the other hand, when there is no controller used to perform the collaboration operation at the current moment according to the determination among the controllers as the targets that perform the collaboration operation, the processing proceeds to step S180. It should be noted that operation determination means determines whether or not an operation is performed on at least one controller operated by a user belonging to a team. The operation determination means corresponds to, as an example, the processor 81 that performs the processes of steps S177 and S176.

In step S179, the processor 81 sets, to the actions of waiting for the collaboration operation of other users, the actions of the player characters PC operated by the controllers used to perform the collaboration operation according to the determination, and the processing proceeds to step S180. As an example, when the actions of the player characters PC when the collaboration operation is successful are the actions of high-fiving each other, the processor 81 sets the actions of bending down before the player characters PC jump, as the actions of waiting for the collaboration operation of the other users, thereby updating the character action data Dk.

In step S180, the processor 81 determines whether or not the collaboration operation of all the users on the character team is successful. For example, when it is determined in the above step S178 that the collaboration operation is performed using all the controllers operated by the users on the character team, the determination of the processor 81 is affirmative in the above step S180. Then, when the collaboration operation of all the users on the character team is successful, the processing proceeds to step S181. On the other hand, when the collaboration operation of all the users on the character team is not successful, the processing proceeds to step S184. It should be noted that based on the determination, success determination means determines whether or not a success condition is satisfied. When it is determined that the success condition is satisfied, game representation means performs a predetermined game representation. The game representation means corresponds to, as an example, the processor 81 that performs the process of step S180.

In step S181, the processor 81 performs a collaboration operation success representation process, and the processing proceeds to the next step. For example, the processor 81 updates the character action data Dk such that the characters belonging to the character team perform actions corresponding to user actions in the collaboration operation. As an example, when the collaboration operation for thrusting forward each controller is performed, the processor 81 updates the character action data Dk such that the player characters PC1 and PC2 and the non-player characters NPC1 and NPC2 belonging to the character team gather at the center of the screen and perform actions simulating user actions in the collaboration operation (see FIG. 13).

Next, the processor 81 adds a time based on the success of the collaboration operation to the remaining time set in the main game of the character team, thereby updating the remaining time (step S182). Then, the processing proceeds to the next step. For example, the processor 81 adds a time based on the success of the collaboration operation to the remaining time indicated by the remaining time data De and updates the remaining time data De using the remaining time after the addition. Further, the processor 81 generates an image informing the character team that the time is added to the remaining time for the character team. Then, the processor 81 displays the image on the display device (e.g., the stationary monitor 6) (see FIG. 13) in the display control process in step S128 described later.

Next, the processor 81 sets each of the waiting-for-operation flag and the sub-game flag to off (step S183), and the processing of this subroutine ends. For example, the processor 81 changes the waiting-for-operation flag indicated by the waiting-for-operation flag data Dj to off and changes the sub-game flag indicated by the sub-game flag data Dh to off, thereby updating the waiting-for-operation flag and the sub-game flag. Further, the processor 81 initializes the waiting-for-operation time to 0, thereby updating the waiting-for-operation time data Df. Further, the processor 81 performs the process of reading the situation of the suspended main game of the character team and resuming the main game. Further, the processor 81 generates the remaining time notification image T for informing the character team that the time is added to the remaining time indicated by the remaining time data De. Then, the processor 81 displays the image on the display device (e.g., the stationary monitor 6) (see FIG. 14) in the display control process in step S128 described later.

On the other hand, when it is determined in the above step S180 that the collaboration operation of all the users on the character team is not yet successful, the processor 81 determines whether or not the waiting-for-operation time ends (step S184). For example, when the waiting-for-operation time indicated by the waiting-for-operation time data Df reaches a threshold time determined in advance, the determination of the processor 81 is affirmative in the above step S184. Then, when the waiting-for-operation time ends, the processing proceeds to step S185. On the other hand, when the waiting-for-operation time does not end, the processing of this subroutine ends.

In step S185, the processor 81 performs a collaboration operation failure representation process, and the processing proceeds to the next step. For example, the processor 81 updates the character action data Dk such that all the characters belonging to the character team perform the actions of being disappointed.

Next, the processor 81 sets each of the waiting-for-operation flag and the sub-game flag to off (step S186), and the processing of this subroutine ends. For example, the processor 81 changes the waiting-for-operation flag indicated by the waiting-for-operation flag data Dj to off and changes the sub-game flag indicated by the sub-game flag data Dh to off, thereby updating the waiting-for-operation flag and the sub-game flag. Further, the processor 81 initializes the waiting-for-operation time to 0, thereby updating the waiting-for-operation time data Df. Further, the processor 81 performs the process of reading the situation of the suspended main game of the character team and resuming the main game. Further, the processor 81 generates the remaining time notification image T for informing the character team that the time is added to the remaining time indicated by the remaining time data De. Then, the processor 81 displays the image on the display device (e.g., the stationary monitor 6) (see FIG. 14) in the display control process in step S128 described later.

Referring back to FIG. 16, in step S128, the processor 81 performs a display control process, and the processing proceeds to the next step. For example, using the character action data Dk, the processor 81 places the player characters PC, the non-player characters NPC, and the like on the game field. Then, the processor 81 performs the process of generating a virtual space image in which the game field is viewed from a virtual camera placed at a predetermined position, and displaying the virtual space image on a display screen of the display device (e.g., the stationary monitor 6). Further, when display images such as an image indicating the result of each game, an image indicating that a time is added to the remaining time of the main game, the remaining time notification image T, the collaboration operation notification image N, and the like are generated in the above processing, the processor 81 performs the process of combining the virtual space image with the images such that the images are included in the virtual space image, and displaying the virtual space image on the display screen of the display device.

Next, the processor 81 performs the process of outputting data to the left controller 3 and the right controller 4 in each data transmission cycle (step S129), and the processing proceeds to the next step. For example, when vibration data to be output to each controller is stored in the vibration data Dg, the processor 81 performs the process of outputting the vibration data stored in the vibration data Dg to the controller as a transmission destination, which is a target to which the vibration data is transmitted. The vibration data is thus output to each controller, whereby the left controller 3 and/or the right controller 4 having acquired the vibration data each vibrate based on a vibration waveform corresponding to the vibration data of the controller.

Next, the processor 81 determines whether or not the main game is to be ended (step S130). Examples of a condition for ending the game in the above step S130 include the fact that the result of the main game is finalized, the fact that the remaining time in the main game indicated in the remaining time data De is 0, the fact that a user performs the operation of ending the main game, and the like. When the main game is not to be ended, the processing returns to the above step S124, and the process of step S124 is repeated. When the main game is to be ended, the processing of the flow chart ends. Hereinafter, the series of processes of steps S124 to S130 are repeatedly executed until it is determined in step S130 that the main game is to be ended.

As described above, in the exemplary embodiment, in a game played by a character team to which player characters PC operated by a plurality of users belong, the users are notified of a collaboration operation by an image urging the collaboration operation and also notified of the collaboration operation by vibrations to controller operated by the users. Then, when the collaboration operation by the plurality of users is successful, a representation corresponding to the success of the collaboration operation is performed. Thus, it is possible to enhance the interest of a user in a game where a group of teams is set.

It should be noted that in the exemplary processing based on the above flow chart, a case has been used where a main game and a sub-game are performed by one of character teams to which a plurality of player characters PC operated by a plurality of users belong. A form is also possible in which a plurality of character teams to which a plurality of player characters PC operated by a plurality of users belong are set, and the character teams participate in a main game and a sub-game. In this case, it is also possible that only either one of the character teams acquires the right to perform the sub-game, or that one of the character teams obtains an excellent result and the other character team obtains a poor result in a mini-game. As described above, when a plurality of character teams operated by a plurality of users participate, the steps in the flow charts are performed in parallel with respect to each character team, and when different results are obtained, both results are displayed on the same display screen, and one of the character teams waits for the progress of the game of the other character team, whereby it is possible to similarly achieve the above processing.

Further, in the above description, an example has been used where the operation determination process is performed by the main body apparatus 2. Alternatively, at least a part of the operation determination process may be performed by the left controller 3 and/or the right controller 4. For example, the process of calculating the accelerations, the angular velocities, and the orientation of the left controller 3, the process of calculating the axial directions of the left controller 3 and the amounts of change in the axial directions, the process of calculating an acceleration generated in left controller 3 (a gravitational acceleration), and the like may be performed in the left controller 3. Yet alternatively, the process of calculating the accelerations, the angular velocities, and the orientation of the right controller 4, the process of calculating the axial directions of the right controller 4 and the amounts of change in the axial directions, the process of calculating an acceleration generated in the right controller 4 (a gravitational acceleration), and the like may be performed in the right controller 4.

Further, in the above exemplary embodiment, a method for detecting the motion or the orientation of the left controller 3 or the right controller 4 is a mere example. Alternatively, the motion or the orientation of the left controller 3 or the right controller 4 may be detected using another method or another piece of data. Further, in the above exemplary embodiment, a game image corresponding to an operation using the left controller 3 or the right controller 4 is displayed on the stationary monitor 6, but may be displayed on the display 12 of the main body apparatus 2. Further, the controller for controlling the action of the player character PC may be not only the left controller 3 or the right controller 4, but also another controller.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment may be used as an information processing program, an information processing apparatus, an information processing system, an information processing method, and the like that are capable of enhancing the interest of a user in a game where a group of teams is set.

What is claimed is:

1. A non-transitory computer-readable storage medium having stored therein an information processing program executed by a computer included in an information processing apparatus for performing a process using a controller including an inertial sensor, the information processing program causing the computer to execute operations comprising:

setting a group of teams including at least one team composed of a plurality of users belonging to the team;

executing a first game played by at least one of the plurality of users belonging to the team to produce a result;

executing a second game influenced by the result of the first game;

after the first game is ended; outputting a first signal for giving a first notification by at least one of an image and a sound, for urging the at least one user belonging to the team to perform an operation of moving the entire controller;

outputting a second signal for giving to the controller, together with the first notification, a second notification for vibrating the controller operated by the at least one user belonging to the team;

determining whether or not the operation of moving the entire controller is collaboratively performed by the plurality of users belonging to the team;

based on the determination, determining whether or not a success condition is satisfied; and when it is determined that the success condition is satisfied after the first game is ended, increasing or decreasing a game parameter used in the second game.

2. The non-transitory computer-readable storage medium having stored therein the information processing program according to claim 1, wherein
in the executing of the first game, the first game is executed in the middle of the second game.

3. The non-transitory computer-readable storage medium having stored therein the information processing program according to claim 1, wherein
in the increasing or decreasing of the game parameter, a remaining time until the second game ends is increased as an advantageous effect for the team or the at least one user belonging to the team.

4. The non-transitory computer-readable storage medium having stored therein the information processing program according to claim 1, wherein
in the increasing or decreasing of the game parameter, when it is determined that the success condition is satisfied, an advantageous effect in the first game is given to the team or the user belonging to the team.

5. The non-transitory computer-readable storage medium having stored therein the information processing program according to claim 1, wherein
in the increasing or decreasing of the game parameter, when it is determined that the success condition is satisfied, an advantageous effect in the first game is given to the team or the user belonging to the team.

6. The non-transitory computer-readable storage medium having stored therein the information processing program according to claim 1, wherein
in the executing of the first game, a game where a plurality of teams compete against each other is executed as the first game, and
the second notification is given to a team having won the first game or obtained a predetermined accomplishment in the first game.

7. The non-transitory computer-readable storage medium having stored therein the information processing program according to claim 1, wherein
in the determining of whether or not the success condition is satisfied, when it is determined that the operation of moving the entire controller is collaboratively performed by all the plurality of users belonging to the team, it is determined that the success condition is satisfied.

8. The non-transitory computer-readable storage medium having stored therein the information processing program according to claim 1, wherein
in the determining of whether or not the success condition is satisfied, when the operation of moving the entire controller is collaboratively performed, using the controllers operated by a plurality of users belonging to the team within a determination period set before and/or after the second notification, it is determined that the success condition is satisfied.

9. The non-transitory computer-readable storage medium having stored therein the information processing program according to claim 1, wherein
in the determining of whether or not the operation of moving the entire controller is performed, when it is not determined that the success condition is satisfied within a threshold time since the first notification is given, a process of determining whether or not the operation of moving the entire controller is performed is ended.

10. The non-transitory computer-readable storage medium having stored therein the information processing program according to claim 1, wherein
the first notification is given multiple times, and
the second notification is given in accordance with a timing when the first notification is given.

11. The non-transitory computer-readable storage medium having stored therein the information processing program according to claim 1, wherein
in the increasing or decreasing of the game parameter, a representation is performed in which a character that is operated by the user and appears in the first game performs a motion corresponding to the operation of moving the entire controller.

12. An information processing apparatus for performing a process using a controller including an inertial sensor, the information processing apparatus comprising at least one computer configured to perform operations comprising:
set a group of teams including at least one team composed of a plurality of users;
execute a first game played by at least one user belonging to the team;
execute a second game influenced by a result of the first game;
after the first game is ended, output a first signal for giving a first notification for, by at least one of an image and a sound, urging the at least one user of the team to perform an operation of rotating the controller, and/or swinging the controller;
output a second signal for giving to the controller, together with the first notification, a second notification for vibrating the controller operated by the at least one user belonging to the team;
determine whether or not the operation of rotating the controller, and/or swinging the controller is collaboratively performed by the plurality of users belonging to the team;
based on the determination, determine whether or not a success condition is satisfied; and
when it is determined that the success condition is satisfied after the first game is ended, increase or decrease a game parameter used in the second game.

13. An information processing system including a controller including an inertial sensor, and an information processing apparatus for performing a process using the controller, the information processing apparatus comprising at least one computer configured to perform operations comprising:
set a group of teams including at least one team composed of a plurality of users;
execute a first game played by at least one user belonging to the team;
execute a second game influenced by a result of the first game;
after the first game is ended, output a first signal for giving a first notification for, by at least one of an image and a sound, urging the user of the team to perform an operation of rotating the controller, and/or swinging the controller;
output a second signal for giving to the controller, together with the first notification, a second notification for vibrating the controller operated by the at least one user belonging to the team;
determine whether or not the operation of rotating the controller, and/or swinging the controller is collaboratively performed by the plurality of users belonging to the team;
based on the determination, determine whether or not a success condition is satisfied; and
when it is determined that the success condition is satisfied after the first game is ended, increase or decrease a game parameter used in the second game.

14. An information processing method for performing a process using controllers including inertial sensors, the information processing method comprising:
setting at least one team comprising a plurality of users belonging to the team, each of the plurality of users operating a respective controller including an inertial sensor;
executing a first game played by at least one of the plurality of users belonging to the team;
executing a second game influenced by a result of the first game;
after the first game ends, outputting a first signal for giving at least one of a visual and an aural notification for urging rotating the controller, and/or swinging the controller;
outputting a second signal for giving, together with the first notification, commanding controller vibration;
determining whether or not the plurality of users belonging to the team collaboratively perform the operation of rotating the controller, and/or swinging the controller with their respective controllers by;
based on determining whether or not the plurality of users belonging to the team collaboratively perform rotating the controllers, and/or swinging the controllers, determining whether or not a success condition is satisfied; and
when it is determined that the success condition is satisfied after the first game is ended, increasing or decreasing a game parameter used in the second game.

* * * * *